US012675446B1

(12) United States Patent (10) Patent No.: US 12,675,446 B1

Liang et al. (45) Date of Patent: Jul. 7, 2026

(54) AI AGENT-BASED SEMANTIC DATA UPDATER

(71) Applicant: Snowflake Inc., Bozeman, MT (US)

(72) Inventors: Jia Yao Liang, San Mateo, CA (US); Kyle Duncan Schmaus, San Francisco, CA (US); Chiu Wah So, Saratoga, CA (US); Artiom Zayats, Seattle, WA (US)

(73) Assignee: Snowflake Inc., Bozeman, MT (US)

( * ) Notice: Subject to any disclaimer, the term of this patent is extended or adjusted under 35 U.S.C. 154(b) by 0 days.

(21) Appl. No.: 19/194,664

(22) Filed: Apr. 30, 2025

(51) Int. Cl.
*G06F 16/21* (2019.01)
*G06F 16/215* (2019.01)

(52) U.S. Cl.
CPC .......... *G06F 16/211* (2019.01); *G06F 16/215* (2019.01); *G06F 16/217* (2019.01)

(58) Field of Classification Search
CPC ..... G06F 16/211; G06F 16/215; G06F 16/217
USPC ........................................ 707/803
See application file for complete search history.

(56) References Cited

U.S. PATENT DOCUMENTS

| | | | | |
|---|---|---|---|---|
| 12,271,374 | B1 * | 4/2025 | Lai | G06F 16/242 |
| 12,481,517 | B1 * | 11/2025 | Zhang | G06F 9/45504 |
| 12,505,095 | B1 * | 12/2025 | Rozen | G06F 16/2433 |
| 2017/0060868 | A1 * | 3/2017 | Rais Ghasem | G06F 16/243 |
| 2020/0073983 | A1 * | 3/2020 | Sen | G06F 16/243 |
| 2022/0374420 | A1 * | 11/2022 | Relan | G06F 16/243 |
| 2024/0184829 | A1 * | 6/2024 | Roy | G06F 16/243 |
| 2025/0272282 | A1 * | 8/2025 | Chen | G06F 16/24522 |
| 2025/0307236 | A1 * | 10/2025 | Tang | G06F 16/24534 |
| 2025/0328567 | A1 * | 10/2025 | Suba | G06F 16/33295 |
| 2026/0023760 | A1 * | 1/2026 | Streufert | G06F 16/287 |
| 2026/0030241 | A1 * | 1/2026 | Rokka Chhetri | G06F 16/243 |
| 2026/0037505 | A1 * | 2/2026 | Vu | G06F 16/24522 |

FOREIGN PATENT DOCUMENTS

| | | | | | |
|---|---|---|---|---|---|
| CN | 118733608 | A | * 10/2024 | | G06F 16/245 |
| CN | 118939681 | A | * 11/2024 | | G06F 18/22 |
| CN | 119166656 | A | * 12/2024 | | G06F 40/16 |
| CN | 119415538 | A | * 2/2025 | | G06N 20/00 |

(Continued)

OTHER PUBLICATIONS

Du et al., "FI-NL2PY2SQL: Financial Industry NL2SQL Innovation Model Based on Python and Large Language Model", Future Internet, Jan. 2025, vol. 17(1), p. 12, pp. 1-24. (Year: 2025).*

*Primary Examiner* — Phuong Thao Cao

(74) *Attorney, Agent, or Firm* — Schwegman Lundberg & Woessner, P.A.

(57) ABSTRACT

Various example embodiments described herein provide for systems, methods, devices, instructions, and like for translation to semantic data for artificial intelligence (AI) agent-based semantic data updates (e.g., improvements) using one or more data sources, such as golden data sources, where the updated semantic data (e.g., semantic model) that results can be used by a natural language query system to translate one or more natural language questions into one or more structure language queries (e.g., one or more structured query language (SQL) statements). Some example embodiments are implemented as a system that uses a set of AI agents working in an optimization loop to improve/refine semantic data using the one or more data sources.

20 Claims, 19 Drawing Sheets

(56) References Cited

FOREIGN PATENT DOCUMENTS

| | | | | | |
|----|----|----|---|--------|-----------|
| CN | 114547329 | B | * | 3/2025 | ......... G06F 16/2433 |
| CN | 119691096 | A | * | 3/2025 | |
| KR | 20250014655 | A | * | 2/2025 | ............... G06N 3/04 |
| WO | WO-2025064877 | A1 | * | 3/2025 | ............. G06N 3/045 |
| WO | WO-2025137522 | A1 | * | 6/2025 | ......... G06F 16/2423 |

* cited by examiner

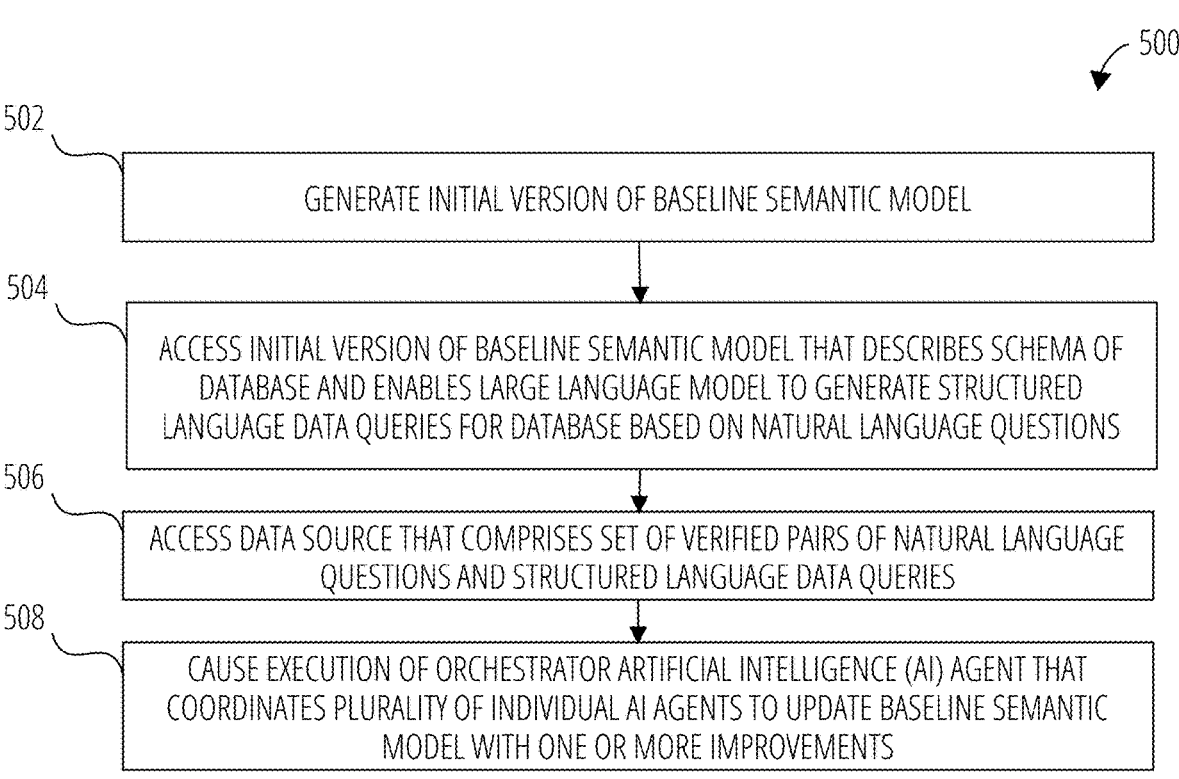

502

GENERATE INITIAL VERSION OF BASELINE SEMANTIC MODEL

504

ACCESS INITIAL VERSION OF BASELINE SEMANTIC MODEL THAT DESCRIBES SCHEMA OF DATABASE AND ENABLES LARGE LANGUAGE MODEL TO GENERATE STRUCTURED LANGUAGE DATA QUERIES FOR DATABASE BASED ON NATURAL LANGUAGE QUESTIONS

506

ACCESS DATA SOURCE THAT COMPRISES SET OF VERIFIED PAIRS OF NATURAL LANGUAGE QUESTIONS AND STRUCTURED LANGUAGE DATA QUERIES

508

CAUSE EXECUTION OF ORCHESTRATOR ARTIFICIAL INTELLIGENCE (AI) AGENT THAT COORDINATES PLURALITY OF INDIVIDUAL AI AGENTS TO UPDATE BASELINE SEMANTIC MODEL WITH ONE OR MORE IMPROVEMENTS

602 — ACCESS LATEST VERSION OF BASELINE SEMANTIC MODEL

604 — DETERMINE INDIVIDUAL AI AGENT FOR UPDATING LATEST VERSION OF BASELINE SEMANTIC MODEL

606 — CAUSE INDIVIDUAL AI AGENT TO UPDATE LATEST VERSION OF BASELINE SEMANTIC MODEL

608 — RECEIVE UPDATED VERSION OF BASELINE SEMANTIC MODEL FROM INDIVIDUAL AI AGENT

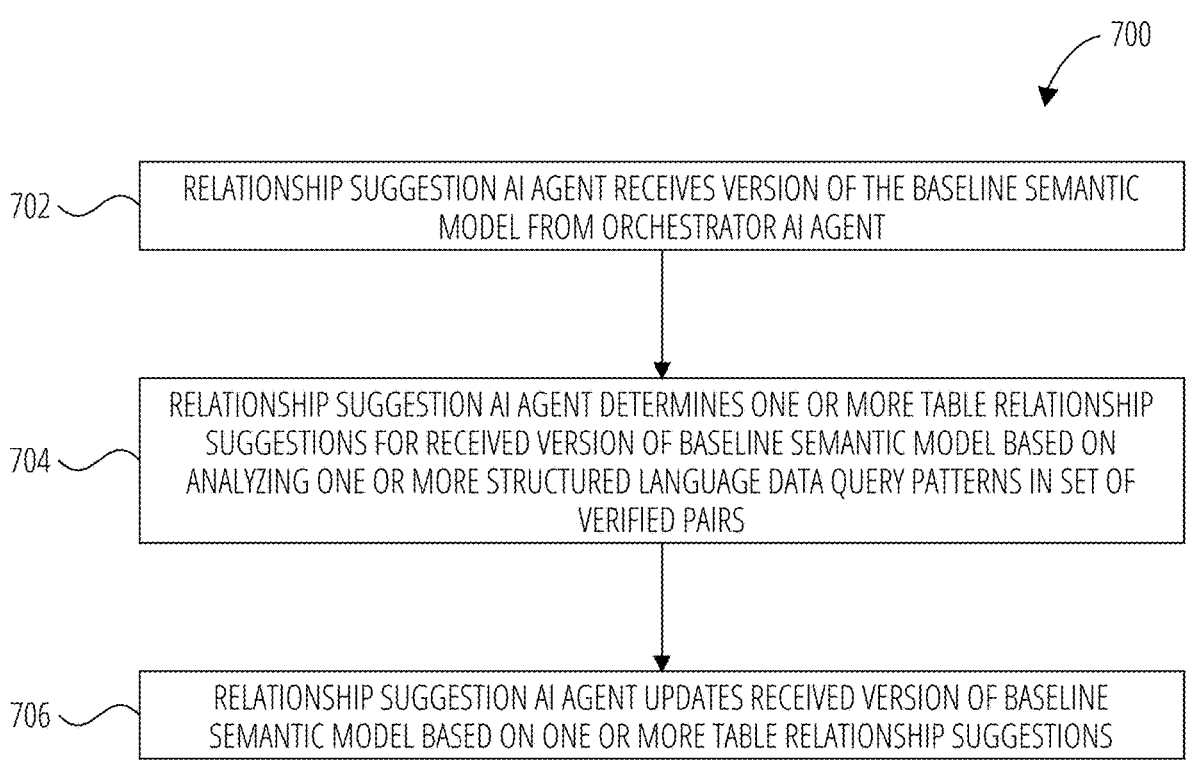

702 — RELATIONSHIP SUGGESTION AI AGENT RECEIVES VERSION OF THE BASELINE SEMANTIC MODEL FROM ORCHESTRATOR AI AGENT

704 — RELATIONSHIP SUGGESTION AI AGENT DETERMINES ONE OR MORE TABLE RELATIONSHIP SUGGESTIONS FOR RECEIVED VERSION OF BASELINE SEMANTIC MODEL BASED ON ANALYZING ONE OR MORE STRUCTURED LANGUAGE DATA QUERY PATTERNS IN SET OF VERIFIED PAIRS

706 — RELATIONSHIP SUGGESTION AI AGENT UPDATES RECEIVED VERSION OF BASELINE SEMANTIC MODEL BASED ON ONE OR MORE TABLE RELATIONSHIP SUGGESTIONS

FIG. 7

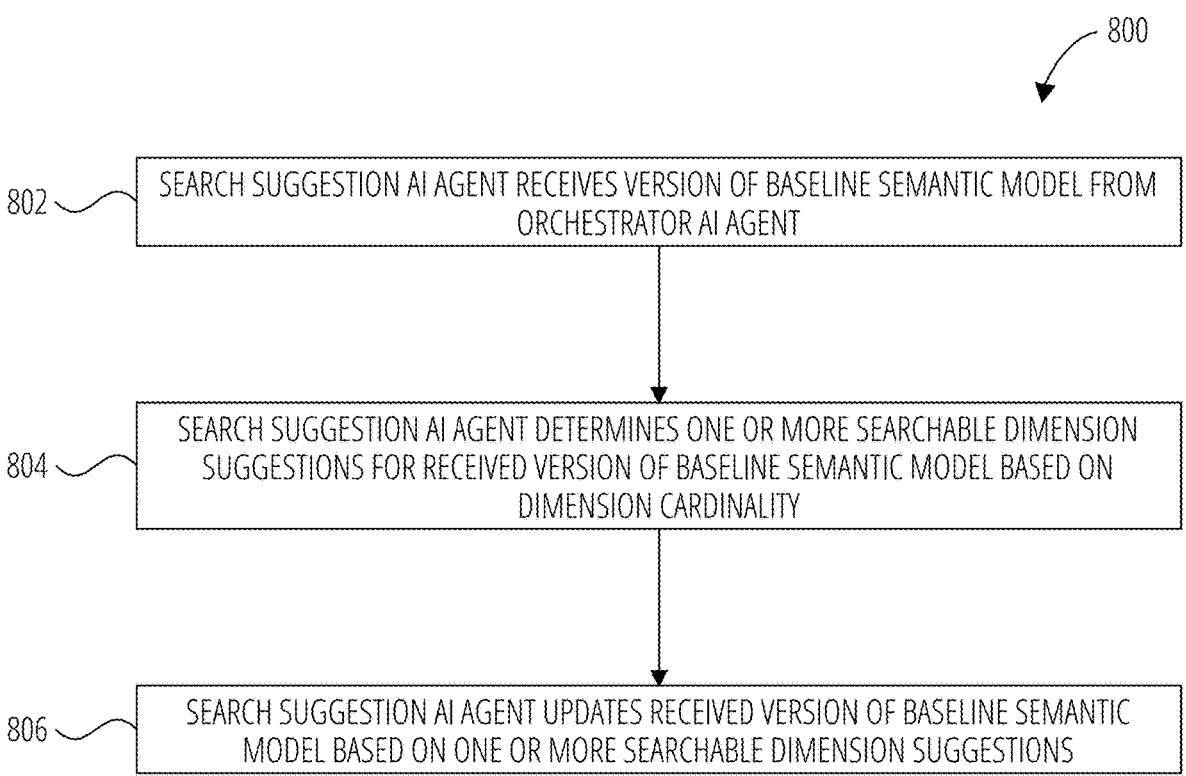

800

802 — SEARCH SUGGESTION AI AGENT RECEIVES VERSION OF BASELINE SEMANTIC MODEL FROM ORCHESTRATOR AI AGENT

804 — SEARCH SUGGESTION AI AGENT DETERMINES ONE OR MORE SEARCHABLE DIMENSION SUGGESTIONS FOR RECEIVED VERSION OF BASELINE SEMANTIC MODEL BASED ON DIMENSION CARDINALITY

806 — SEARCH SUGGESTION AI AGENT UPDATES RECEIVED VERSION OF BASELINE SEMANTIC MODEL BASED ON ONE OR MORE SEARCHABLE DIMENSION SUGGESTIONS

902 — EDIT SUGGESTION AI AGENT RECEIVES VERSION OF BASELINE SEMANTIC MODEL FROM ORCHESTRATOR AI AGENT

904 — EDIT SUGGESTION AI AGENT DETERMINES ONE OR MORE EDIT SUGGESTIONS FOR RECEIVED VERSION OF BASELINE SEMANTIC MODEL BASED TO IMPROVE ACCURACY

906 — EDIT SUGGESTION AI AGENT UPDATES RECEIVED VERSION OF BASELINE SEMANTIC MODEL BASED ON ONE OR MORE EDIT SUGGESTIONS

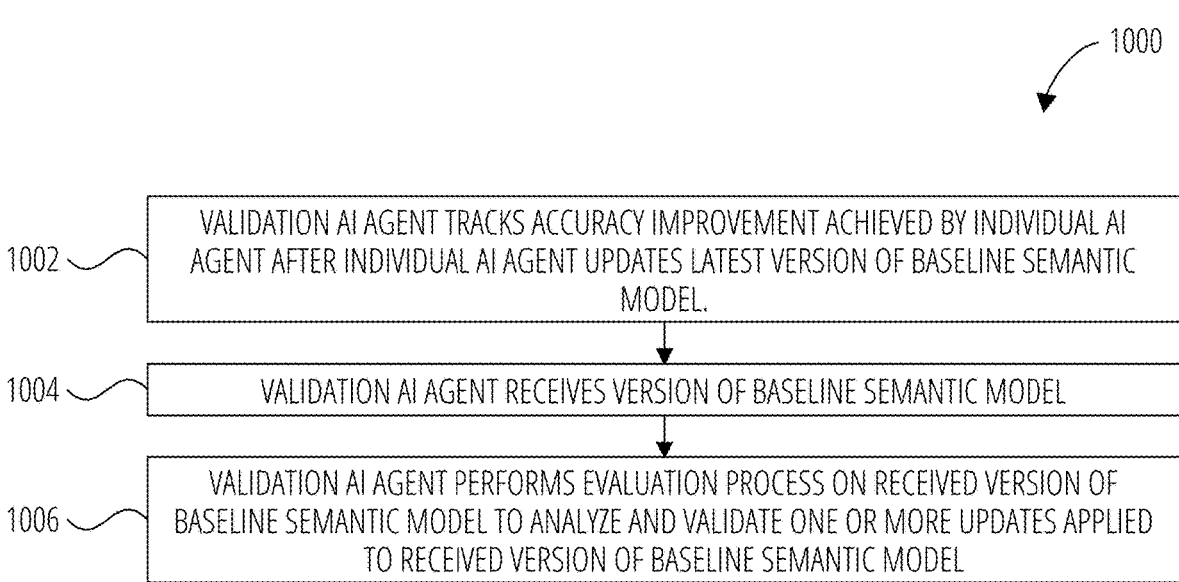

1000

1002 — VALIDATION AI AGENT TRACKS ACCURACY IMPROVEMENT ACHIEVED BY INDIVIDUAL AI AGENT AFTER INDIVIDUAL AI AGENT UPDATES LATEST VERSION OF BASELINE SEMANTIC MODEL.

1004 — VALIDATION AI AGENT RECEIVES VERSION OF BASELINE SEMANTIC MODEL

1006 — VALIDATION AI AGENT PERFORMS EVALUATION PROCESS ON RECEIVED VERSION OF BASELINE SEMANTIC MODEL TO ANALYZE AND VALIDATE ONE OR MORE UPDATES APPLIED TO RECEIVED VERSION OF BASELINE SEMANTIC MODEL

FIG. 10

AI AGENT-BASED SEMANTIC DATA UPDATER

TECHNICAL FIELD

Embodiments described herein relate to data systems and, more particularly, to systems, methods, devices, and instructions for using one or more artificial intelligence (AI) agents to updating semantic data, where the semantic data can enable generation of a structured language data query for a data store based on a natural language question.

BACKGROUND

Traditionally, interacting with large datasets has involved substantial technical expertise, particularly in database query languages such as structured query language (SQL). This involvement of technical expertise has limited the ability of certain users, such as business users, who are typically not trained in these technical skills, to directly engage with data systems to extract desired data or valuable insights (e.g., business insights) based on stored data.

The advent of natural language processing (NLP) technologies has begun to shift this landscape. Additionally, the integration of artificial intelligence (AI) technologies, such as Large Language Models (LLMs), into data systems has allowed users with little to no technical expertise to interact with databases through natural language. This development has significantly lowered the barrier to entry for business users, enabling them to pose questions to databases in plain language without the need for understanding complex query syntax.

BRIEF DESCRIPTION OF THE SEVERAL VIEWS OF THE DRAWINGS

Various ones of the appended drawings merely illustrate various example embodiments of the present disclosure and should not be considered as limiting its scope. In the drawings, which are not necessarily drawn to scale, like numerals may describe similar components in different views. To easily identify the discussion of any particular element or act, the most significant digit or digits in a reference number refer to the figure number in which that element is first introduced.

FIG. 5 is a flowchart of an example method for using one or more AI agents to update semantic data, according to some example embodiments of the present disclosure.

FIG. 7 is a flowchart of an example method for a relationship suggestion AI agent, according to some example embodiments of the present disclosure.

FIG. 8 is a flowchart of an example method for a search suggestion AI agent, according to some example embodiments of the present disclosure.

FIG. 10 is a flowchart of an example method for a validation AI agent, according to some example embodiments of the present disclosure.

DETAILED DESCRIPTION

Figure 1:
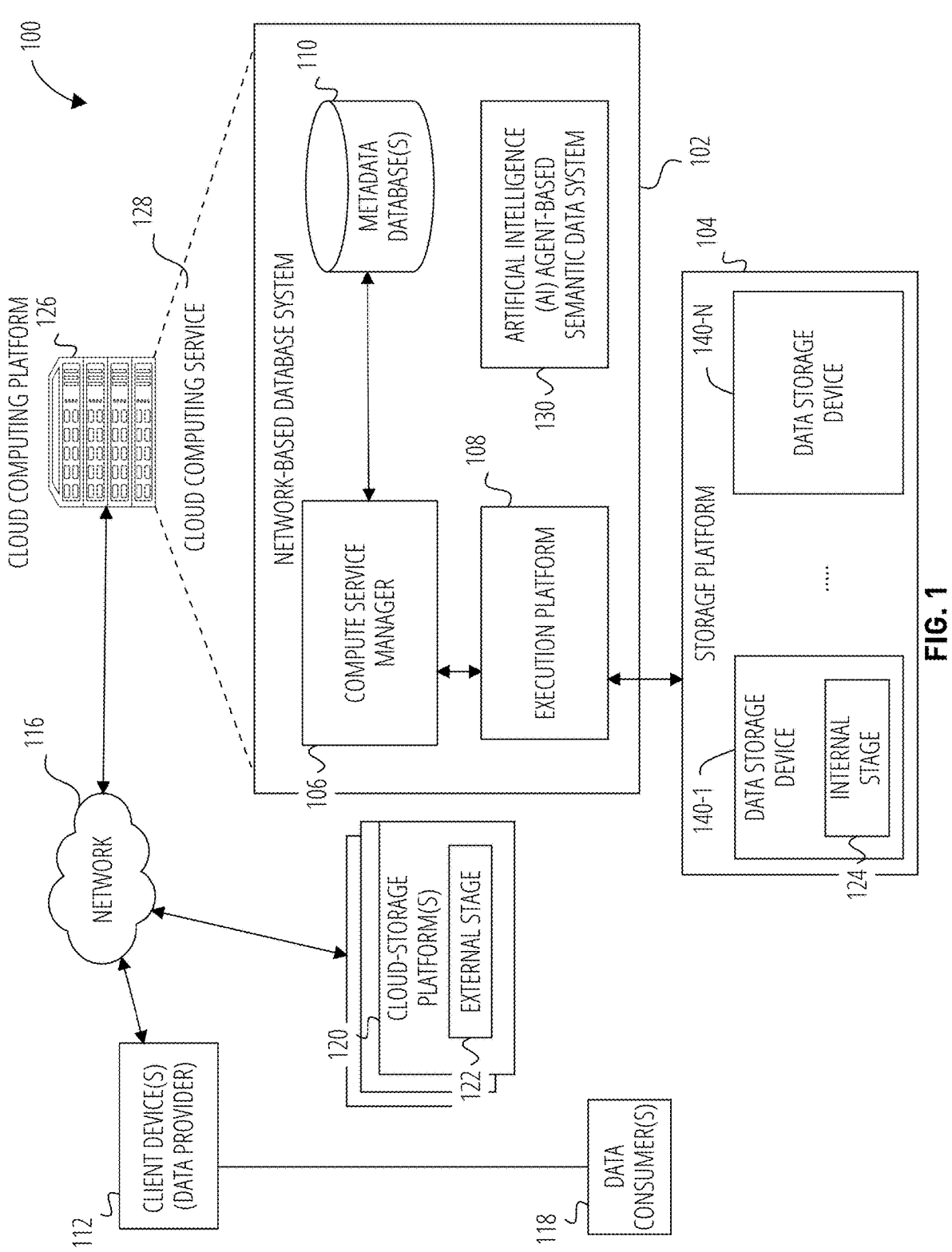
FIG. 1 illustrates an example computing environment comprising a database system in the example form of a network-based database system that includes an artificial intelligence (AI) agent-based semantic data update system, according to some example embodiments of the present disclosure.

Reference will now be made in detail to specific embodiments for carrying out the inventive subject matter. Examples of these specific embodiments are illustrated in the accompanying drawings, and specific details are outlined in the following description to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure.

Natural language interfaces to databases have traditionally presented significant technical challenges. Translating human language questions into structured query language requires bridging the gap between everyday terminology and formal database schemas. The translation process can demand a sophisticated understanding of both linguistic nuances and database structures. For example, database schemas themselves present inherent complexity, with multiple tables containing various data types and relationships. The technical nature of database structures often creates a disconnect between how business users conceptualize their data needs and how that data is actually stored and organized. Additionally, evaluation of query accuracy presents another challenge, as determining whether a generated query correctly answers the original natural language question involves sophisticated comparison techniques beyond simple string matching. This evaluation must often account for semantic equivalence rather than just syntactic similarity.

Semantic data (e.g., semantic models) can serve as an intermediary in the translation of human language questions into structured query language, where the semantic data can provide a layer that maps human concepts (e.g., business concepts) to technical database implementations. In this way, semantic data can serve as a critical intermediary between human language and database structures. However, creating effective semantic data involves deep knowledge of both the business domain and database architecture. The manual development of this data (e.g., models) can be labor-intensive and involve iterative refinement to accurately capture relationships between tables, define appropriate metrics, and establish proper search capabilities. As a result, organizations struggle with creating high-quality semantic data, with most organizations ending up stuck in the creation/iteration phase (e.g., manually iterating and optimizing their semantic models) and spending significant time and resources developing semantic layers rather than moving to production use.

Various example embodiments described herein provide for systems, methods, devices, instructions, and like address these and other problems of conventional semantic data-based translation processes. In particular, various example embodiments provide for artificial intelligence (AI) agent-based semantic data updates (e.g., improvements) using one or more data sources (e.g., golden data sources), where the updated semantic data (e.g., semantic model) that results can be used by a natural language query system to translate one or more (human) natural language questions into one or more structure language queries (e.g., one or more structured query language (SQL) statements). As used herein, an AI agent (or agent) can comprise an entity implemented in software or hardware that is configured to receive or perceive inputs and autonomously perform one or more actions based on those inputs to achieve a specified objective or set of objectives. An AI agent can perform the one or more actions using an internal state, one or more learned policies, or external knowledge sources. A large language model (LLM) agent can refer to an AI agent comprising or implemented using an LLM.

Some example embodiments are implemented as a system (e.g., an automated system) that uses a set of AI agents (e.g., coordinated set of specialized AI agents) working in an optimization loop to improve/refine semantic data (e.g., semantic model) using one or more data sources. Some example embodiments leverage one or more data sources, such as golden data sources which can include verified pairs of natural language questions and structured language data queries (e.g., golden set of question-SQL pairings), dashboard queries (e.g., pairings of natural language questions and correct SQL statements but with titles that lack clarity), and query history (e.g., comprising SQL queries only, which can provide insight into query frequency), to extract relevant business context and structured language data query patterns. According to various example embodiments, a set of AI agents (e.g., specialized AI agents) used by a system described herein comprises: a relationship suggestion AI agent that suggests one or more table relationships to be included to semantic data based on one or more data sources (e.g., one or more golden data sources) and analyzing correct structured language data query patterns (e.g., SQL patterns); a search suggestion AI agent that integrates searchable dimensions to semantic data (e.g., based on dimension cardinality); an edit suggestion AI agent that generates and applies one or more edits to semantic data edits (e.g., targeted semantic model edits that address discrepancies or provide custom instructions for LLM that will perform natural language question to structured language data query translation) to improve accuracy of the semantic data; and a validation AI agent that analyzes and validates one or more changes made to semantic data through an evaluation process (e.g., multi-step evaluation process). For some example embodiments, one or more of the AI agents of the system are managed by an orchestrator AI agent, which can decide when and how to use each AI agent to refine semantic data (e.g., an individual semantic model). For example, at least one (e.g., each) of the orchestrator AI agent, the search suggestion AI agent, the edit suggestion AI agent, and the validation AI agent comprises (or is implemented using) a large language model.

During operation, the orchestrator AI agent can cause the relationship suggestion AI model to suggest one or more table relationships for a baseline semantic model to improve the baseline semantic model, which once incorporated into the baseline semantic model results in a first semantic model with improved accuracy (e.g., take accuracy from ~0.2 to ~0.5). The orchestrator AI agent can cause the search suggestion AI model to integrate intelligent searchable dimensions into the first semantic model, which can result in a second semantic model with improved accuracy (e.g., take accuracy from ~0.5 to ~0.6). The orchestrator AI agent can cause the edit suggestion AI model to generate and apply one or more edits to the second semantic model, which can result in a third semantic model with improved accuracy (e.g., take accuracy from ~0.6 to ~0.8). Eventually, the orchestrator AI agent can cause the validation AI model to analyze and validate one or more changes made to the third semantic model through an evaluation process, which can guide application of one or more improvements with respect to the third semantic model that result in a fourth semantic model. Where a system improves an individual semantic model by way of a loop (e.g., optimization loop) that performs multiple iterations to improve the individual semantic model, AI agents selected and used, and the order in which AI agents are used, to improve the individual semantic model can vary between individual iterations.

A relationship suggestion AI agent of some example embodiments receives (e.g., from the orchestrator AI agent) as input one or more of the following: an LLM to be used for inference actions performed by the relationship suggestion AI agent; a client for interacting with a database (e.g., of a network-based database system); an individual semantic model that is to be improved by the relationship suggestion AI agent; and a list of structured language data queries (e.g., SQL queries) to analyze for patterns (e.g., JOIN patterns). The relationship suggestion AI agent of some example embodiments causes generation of a prompt based on at least a portion of the individual semantic model (e.g., as a serialized semantic model that comprises data definition language (DDL) statements) and at least a portion of the list of structured language data queries, where the prompt comprises one or more instructions to identify JOIN paths in each structured language data query in the list, ask to deduplicate the identified JOIN paths, request output relationship definitions, or some combination thereof. Specifically, the prompt can cause the LLM (used by the relationship suggestion AI agent) to look at the correct structured language data queries and primary keys to determine how tables are connected, and do so without explicit database definitions. The relationship suggestion AI agent of some example embodiments submits the generated prompt to an LLM (e.g., LLM specified in the input) and receives in response, as output from the LLM, either one or more relationship suggestions for the individual semantic model, or an updated (e.g., improved) version of the individual semantic model with one or more suggestions (determined by the LLM) applied to the individual semantic model. The output can be in the form of a dictionary, and the updated version of the individual semantic model can comprise YAML data content (e.g., compressed and Base64 encoded YAML data).

A search suggestion AI agent of some example embodiments receives (e.g., from the orchestrator AI agent) as input one or more of the following: an LLM to be used for inference actions performed by the search suggestion AI agent; a client for interacting with a database (e.g., of a network-based database system); an individual semantic model that is to be improved by the search suggestion AI agent; a list of objects that describes one or more pairings of natural language questions and structured language data queries (e.g., SQL statements); a minimum number (e.g., minimum cardinality) of distinct values to consider (e.g., 10); and a maximum number (e.g., maximum cardinality) of distinct values to consider (e.g., 1000000). Each object can comprise a natural language question and a correct structured language data query (e.g., correct SQL statement) for the natural language question, and can further comprise an example structured language data query generated by an LLM (e.g., another LLM) for the natural language question using the individual semantic model and any explanatory text provided by the LLM as part of generating the example structured language data query. The search suggestion AI agent of some example embodiments filters one or more dimensions in the individual semantic model by cardinality (number of distinct values) to identify one or more suitable candidate dimensions. For each natural language question from the list of objects, the search suggestion AI agent of some example embodiments generates one or more search integration suggestions for the individual semantic model. The search suggestion AI agent of some example embodiments aggregates one or more question-specific suggestions for the individual semantic model. Additionally, the search suggestion AI agent of some example embodiments causes generation of a prompt that analyzes the individual semantic model and the one or more pairings of natural language question and structured language data queries, that identifies one or more dimensions that would benefit from fuzzy search integration, that looks for one or more cases where string literals in one or more gold structured language data queries are not provided in the individual semantic model, that considers which dimensions have human-readable values (e.g., versus UUIDs or machine IDs), or some combination thereof. The search suggestion AI agent of some example embodiments submits the generated prompt to an LLM (e.g., LLM specified in the input) and receives in response, as output from the LLM, either one or more search suggestions for the individual semantic model, or an updated (e.g., improved) version of the individual semantic model with one or more search suggestions (determined by the LLM) applied to the individual semantic model. The output can be in the form of a dictionary, and the updated version of the individual semantic model can comprise YAML data content (e.g., compressed and Base64 encoded YAML data).

An edit suggestion AI agent of some example embodiments receives (e.g., from the orchestrator AI agent) as input one or more of the following: an LLM to be used for inference actions performed by the search suggestion AI agent; an individual semantic model that is to be improved by the edit suggestion AI agent; and a list of objects that describes one or more pairings of natural language questions and structured language data queries (e.g., SQL statements). Each object can comprise a natural language question and a correct structured language data query (e.g., correct SQL statement) for the natural language question, and can further comprise an example structured language data query generated by an LLM (e.g., another LLM) for the natural language question using the individual semantic model and any explanatory text provided by the LLM as part of generating the example structured language data query. The edit suggestion AI agent of some example embodiments causes generation of a first prompt based on at least a portion of the individual semantic model (e.g., as a serialized semantic model that comprises data descriptor language (DDL) statements) and at least a portion of the list of objects describing the one or more pairings of natural language questions and structured language data queries, where the first prompt comprises one or more instructions for analyzing discrepancies in the individual semantic model and suggesting one or more improvements for the individual semantic model. In particular, the first prompt can cause the LLM (used by the edit suggestion AI agent) to review the individual semantic model, correct structured language data queries, and generated structured language data queries, to evaluate results, to suggest one or more edits to align business logic and fix errors, and to use question evidence to improve column and metric descriptions. The edit suggestion AI agent of some example embodiments submits the first generated prompt to an LLM (e.g., LLM specified in the input) and receives in response, as output from the LLM, either one or more edit suggestions for the individual semantic model, or an updated (e.g., improved) version of the individual semantic model with one or more edit suggestions (determined by the LLM) applied to the individual semantic model. The output can be in the form of a dictionary, and the updated version of the individual semantic model can comprise YAML data content (e.g., compressed and Base64 encoded YAML data).

The edit suggestion AI agent of some example embodiments causes generation of a second prompt based on at least a portion of the individual semantic model (e.g., as a serialized semantic model that comprises data descriptor language (DDL) statements), one or more existing custom instructions from the individual semantic model, and at least a portion of the list of objects describing the one or more pairings of natural language questions and structured language data queries, where the second prompt comprises one or more instructions for updating one or more of the existing custom instructions for the individual semantic model to improve structured language data query generation by a given LLM that uses the individual semantic model. According to various example embodiments, the one or more custom instructions are intended to bridge gaps between the individual semantic model and a desired output (e.g., to address domain specific needs). The edit suggestion AI agent of some example embodiments submits the second generated prompt to an LLM (e.g., LLM specified in the input) and receives in response, as output from the LLM, either one or more custom instructions for the individual semantic model, or an updated (e.g., improved) version of the individual semantic model with one or more updated custom instructions (determined by the LLM) included in the individual semantic model. The output can be in the form of a dictionary, and the updated version of the individual semantic model can comprise YAML data content (e.g., compressed and Base64 encoded YAML data).

A validation AI agent of some example embodiments receives (e.g., from the orchestrator AI agent) as input one or more of the following: an LLM to be used for inference actions performed by the search suggestion AI agent; and an individual semantic model that is to be validated (e.g., evaluated) by the validation AI agent. The validation AI agent of some example embodiments performs an evaluation process, a validation process, or both to assess the quality of structured language data queries generated by a given LLM using the individual semantic model (e.g., the individual semantic model as improved by the one or more AI agents). The evaluation process can comprise: generating a structured language data query that was generated by a given LLM using the individual semantic model; comparing one or more columns of the generated structured language data query to a correct structured language data query (e.g., from golden set of pairings); and for any differences identified, using a LLM (e.g., identified by the input) to compare data frames and checking whether answers provided by the structured language data queries address an original natural language question. The validation process can comprise: generating a query result using a structured language data query that was generated by a given LLM using the individual semantic model; generating a query result using a correct structured language data query (e.g., from golden set of pairings); and comparing the generated query results to determine accuracy (e.g., equivalent correctness) even when data is formatted differently. For some example embodiments, the validation AI agent of some example embodiments is used to evaluate improvement (e.g., evaluate accuracy value, which can be between 0.0-1.0) of an individual semantic model after it has been updated (e.g., improved) by each AI agent, or after it has been updated by two or more AI agents. In this way, the validation AI agent can provide continuous feedback on updates (e.g., improvements) of an individual semantic model, where the continuous feedback can ensure structural correctness of the individual semantic model, can validate relationship definitions described by the individual semantic model, can confirm search integration effectiveness of the individual semantic model, and can verify semantic accuracy of suggested edits to the individual semantic model. Though various example embodiments are described and shown herein with respect to a certain set of AI agents, some example embodiments can use additional or different AI agents.

Use of various example embodiments on semantic data (e.g., one or more semantic models) can improve accuracy of natural language question to structured language data query translation, while preserving existing semantic knowledge and reducing manual effort. Additionally, the iterative optimization loop used by various example embodiments can enable continuous refinement of semantic data, where each AI agent can build upon previous improvements to create increasingly accurate semantic data.

As used herein, a golden data source can comprise a verified source of natural language questions mapped to correct structured language data query (e.g., SQL statements). Examples of gold data sources can include, without limitation, verified pairs of natural language questions and structured language data queries (e.g., golden set of question-SQL pairings) associated with a data store (e.g., database), dashboard queries (e.g., pairings of natural language questions and correct SQL statements but with titles that lack clarity) associated with a data store (e.g., database), and query history (e.g., comprising SQL queries only, which can provide insight into query frequency) associated with a data store (e.g., database). An example of a golden set of question-SQL pairings can include those associated with a text-to-SQL benchmark dataset, such as Bird (BIg Bench for LaRge-scale Database Grounded Text-to-SQL Evaluation) SQL.

As used herein, a natural language query system can refer to a data system configured to generate a structured language data query based on a natural language question and semantic data associated with a schema of a data store (e.g., database or the like). According to various example embodiments, semantic data comprises a semantic description of (e.g., semantic knowledge regarding) at least a portion of a database schema (or schema) of a data store, such as a database that supports database tables or database views. The data system can use semantic data with one or more large language models (LLMs) to interpret natural language inputs comprising one or more natural language questions (e.g., natural language queries), and to generate one or more corresponding structure language queries (e.g., expressed by a data definition language (DDL), such as structured query language (SQL)) that can be performed (e.g., executed) on a data store (e.g., database) to obtain one or more query responses (e.g., comprising numeric or tabular data), which can be provided to users as responses (e.g., natural language outputs) to the natural language inputs. In this way, the natural language query system can implement natural language query-to-structured language data query processing. Semantic data (e.g., semantic model) can effectively provide business logic and context-specific information about a schema of data store, and can potentially bridge the gap between the technical implementation of a data store (e.g., database) and the business logic, which in turn can bridge the gap between natural language questions posed by users (e.g., business users) and structured language queries used to obtain data from the data store (e.g., a database). For example, the semantic data can comprise a semantic model that labels a database column not just by its name in the database, such as "cust_id," but also provides a semantic description like "Customer ID," along with a detailed explanation of what the customer ID represents in a business context. Such semantic data can enable a data system to understand and generate responses that are contextually relevant to user's natural language questions. Additionally, the semantic understanding provided by semantic data can improve the accuracy and precision of the generated structured language queries.

Natural language questions received as input to a data system (e.g., natural language query system) that uses semantic data can comprise both business and non-business questions from a user to be answered by data (e.g., tabular or numerical data) stored on a data store. With respect to business questions, examples can include business questions relating to sales, such as "Which customer resulted in the highest sales yesterday," "Give me a list of the top 5 customers by sales last month," and "Which date had the highest sales in the summer of 2020." Examples can include various business questions relating to advertising, such as "How many total paid impressions do we have for demand X," partner "What's the monthly average cost per click for advertiser Y," and "What's the YOY change in revenue by paid impressions for publisher Z." Examples can include various business questions relating to real estate, such as "Which zip has the highest number of occupied properties," "Which states have the highest average amount of space occupied," and "How many buildings were constructed last year and what was their square footage."

For various example embodiments, semantic data comprises a semantic model that is a structured representation of at least the portion of the schema of the data store and that provides the semantic description of at least the portion of the schema. The semantic model can be defined by one or more logical tables, where an individual logical table of the one or more logical tables is a view of a data store table (e.g., database table) of the data store or a data store view (e.g., database view) of the data store, where the individual logical table comprises one or more logical columns. An individual logical column of the individual logical table references an underlying column of the data store table or the data store view, or an individual logical column of the individual logical table can comprise an expression that references one or more underlying columns of the data store table or the data store view and that defines a derived column. For example, logical tables of the semantic model can comprise one or more of dimensions (e.g., non-time dimensions), time dimensions, measures, and filters, which collectively can enhance a data system's understanding of the data structure and context of the schema of the data store. The semantic data (e.g., semantic model) can comprise descriptive names, synonyms (e.g., for columns), detailed explanations (e.g., free-form descriptions of tables or columns), or a combination, which can align more closely with business terminology and user understanding rather than technical schema or code syntax. The semantic data can define one or more entities, which can correspond to data structures in an underlying data store (e.g., database), such as tables or views in the data store. Entities can serve as a basis for defining dimensions, measures, and relationships between different data elements (e.g., relationships between tables). Entities can provide an abstraction (e.g., business-friendly abstraction) of the underlying data structures in a data store, which can enable a natural language query system. The semantic data (e.g., semantic model) can be defined in a semantic data file (e.g., content of which is defined in a YAML format or the like), where each semantic data file can comprise a different semantic model. A given schema can be associated with an individual semantic dataset, such as an individual semantic data file. Two schemas can be associated with the same semantic dataset (e.g., the same semantic data file). Semantic data can provide a semantic description for less than all tables or views of a data store, and can provide a semantic description for less than all of a given table or view. For instance, semantic data can comprise a semantic description for only certain, relevant columns of a given table. For various example embodiments, the data store comprises a database, or the like, that can store and organize data according to a schema. Additionally, for some example embodiments, the data store comprises unstructured data. The semantic data can also comprise custom instructions (e.g., for an LLM) that can help bridge gaps between the semantic data (e.g., semantic model) and desired structured language data query output to address domain-specific needs.

Though data systems (for generating structured language data query based on a natural language question) are described herein with respect to business users and business use cases, some example embodiments can be used with non-business users (e.g., technical users) to generate high-precision structure language data queries (e.g., SQL queries) using natural language questions and semantic data, where the high-precision structure language data queries can be provided to the non-business user without automatic execution (e.g., so that a technical user can review and modify the SQL query prior to it be executed).

As used herein, a database schema (or schema) can comprise a logical description that defines how data is stored and organized within a database or a data store. A schema can define, for example, an arrangement of tables, fields (e.g., columns), relationships, and other elements. While a schema can serve as a blueprint that outlines how data is stored and organized within the database, a schema usually does not store the data itself. As used herein, a database can store and manage data in accordance with a schema. A database can include one or more schemas that define different ways data is organized and stored within the database.

As used herein, a dataset can refer to a data point or data records within a database or datastore. As used herein, a large-language model (LLM) can include, without limitation, a GPT model (e.g., GPT-4), a LLAMA model (e.g., LLAMA-2), a MISTRAL model, a Claude model (e.g., Claude 3) or another type of generative model (e.g., a proprietary or tailored, generative pre-trained transformer). Generally, an LLM comprises one or more transformer neural networks, which can be configured (e.g., trained) for general-purpose language generation or another language processing task. An LLM can be constructed using deep learning techniques, such as neural networks, and trained to understand, predict, and generate (as output data) language by learning patterns, semantics, syntax, and contextual meanings from input data. An LLM can operate by processing sequences of text and can perform various tasks, including text completion, translation, summarization, question answering, and dialogue generation, with the ability to generalize across languages and domains based on the scale of training data.

Reference will now be made in detail to various example embodiments of the present disclosure, examples of which are illustrated in the appended drawings. The present disclosure may, however, be embodied in many different forms and should not be construed as being limited to the examples set forth herein.

FIG. 1 illustrates an example computing environment 100 comprising a database system in the example form of a network-based database system 102 that includes an AI agent-based semantic data update system 130, according to some example embodiments of the present disclosure. To avoid obscuring the inventive subject matter with unnecessary detail, various functional components that are not germane to conveying an understanding of the inventive subject matter have been omitted from FIG. 1. However, a skilled artisan will readily recognize that various additional functional components may be included as part of the computing environment 100 to facilitate additional functionality that is not specifically described herein. In other embodiments, the computing environment may comprise another type of network-based database system or a cloud data platform. For example, in some example embodiments, the computing environment 100 may include a cloud computing platform 126 with the network-based database system 102, and a storage platform 104 (also referred to as a cloud storage platform). The cloud computing platform 126 provides computing resources and storage resources that may be acquired (purchased) or leased and configured to execute applications and store data.

The cloud computing platform 126 may host a cloud computing service 128 that facilitates storage of data on the cloud computing platform 126 (e.g., data management and access) and analysis functions (e.g., SQL queries, analysis), as well as other processing capabilities (e.g., configuring replication group objects as described herein). The cloud computing platform 126 may include a three-tier architecture: data storage (e.g., storage platforms 104), an execution platform 108 (e.g., providing query processing), and a compute service manager 106 providing cloud services.

It is often the case that organizations that are customers of a given data platform also maintain data storage (e.g., a data lake) that is external to the data platform (i.e., one or more external storage locations). For example, a company could be a customer of a particular data platform and also separately maintain storage of any number of files—be they unstructured files, semi-structured files, structured files, and/or or files of one or more other types—on, as examples, one or more of their servers and/or on one or more cloud-storage platforms such as AMAZON WEB SERVICES™ (AWS™), MICROSOFT® AZURE®, GOOGLE CLOUD PLATFORM™, and/or the like. The customer's servers and cloud-storage platforms are both examples of what a given customer could use as what is referred to herein as an external storage location. The cloud computing platform 126 could also use a cloud-storage platform as what is referred to herein as an internal storage location concerning the data platform.

From the perspective of the network-based database system 102 of the cloud computing platform 126, one or more files that are stored at one or more storage locations are referred to herein as being organized into one or more of what is referred to herein as either "internal stages" or "external stages." Internal stages (e.g., internal stage 124) are stages that correspond to data storage at one or more internal storage locations, and where external stages are stages that correspond to data storage at one or more external storage locations. In this regard, external files can be stored in external stages at one or more external storage locations, and internal files can be stored in internal stages at one or more internal storage locations, which can include servers managed and controlled by the same organization (e.g., company) that manages and controls the data platform, and which can instead or in addition include data-storage resources operated by a storage provider (e.g., a cloud-storage platform) that is used by the data platform for its "internal" storage. The internal storage of a data platform is also referred to herein as the "storage platform" of the data platform. It is further noted that a given external file that a given customer stores at a given external storage location may or may not be stored in an external stage in the external storage location—i.e., in some data-platform implementations, it is a customer's choice whether to create one or more external stages (e.g., one or more external-stage objects) in the customer's data-platform account as an organizational and functional construct for conveniently interacting via the data platform with one or more external files.

As shown, the network-based database system 102 of the cloud computing platform 126 is in communication with the storage platforms 104 and cloud-storage platforms 120 (e.g., AWS®, Microsoft Azure Blob Storage®, or Google Cloud Storage). The network-based database system 102 is a network-based system used for reporting and analysis of integrated data from one or more disparate sources including one or more storage locations within the storage platform 104. The storage platform 104 comprises a plurality of computing machines and provides on-demand computer system resources such as data storage and computing power to the network-based database system 102.

The network-based database system 102 comprises a compute service manager 106, an execution platform 108, and one or more metadata databases 110. The network-based database system 102 hosts and provides data reporting and analysis services to multiple client accounts.

The compute service manager 106 coordinates and manages operations of the network-based database system 102. The compute service manager 106 also performs query optimization and compilation as well as managing clusters of computing services that provide compute resources (also referred to as "virtual warehouses"). The compute service manager 106 can support any number of client accounts such as end-users providing data storage and retrieval requests, system administrators managing the systems and methods described herein, and other components/devices that interact with compute service manager 106.

The compute service manager 106 is also in communication with a client device 112. The client device 112 corresponds to a user of one of the multiple client accounts supported by the network-based database system 102. A user may utilize the client device 112 to submit data storage, retrieval, and analysis requests to the compute service manager 106. Client device 112 (also referred to as remote computing device or user client device 112) may include one or more of a laptop computer, a desktop computer, a mobile phone (e.g., a smartphone), a tablet computer, a cloud-hosted computer, cloud-hosted serverless processes, or other computing processes or devices may be used (e.g., by a data provider) to access services provided by the cloud computing platform 126 (e.g., cloud computing service 128) by way of a network 116, such as the Internet or a private network. A data consumer 118 can use another computing device to access the data of the data provider (e.g., data obtained via the client device 112).

In the description below, actions are ascribed to users, particularly consumers and providers. Such actions shall be understood to be performed concerning client device (or devices) 112 operated by such users. For example, a notification to a user may be understood to be a notification transmitted to the client device 112, input or instruction from a user may be understood to be received by way of the client device 112, and interaction with an interface by a user shall be understood to be interaction with the interface on the client device 112. In addition, database operations (joining, aggregating, analysis, etc.) ascribed to a user (consumer or provider) shall be understood to include performing such actions by the cloud computing service 128 in response to an instruction from that user.

The compute service manager 106 is also coupled to one or more metadata databases 110 that store metadata about various functions and aspects associated with the network-based database system 102 and its users. For example, a metadata database 110 may include a summary of data stored in remote data storage systems as well as data available from a local cache. Additionally, a metadata database 110 may include information regarding how data is organized in remote data storage systems (e.g., the cloud storage platform 104) and the local caches. Information stored by a metadata database 110 allows systems and services to determine whether a piece of data needs to be accessed without loading or accessing the actual data from a storage device. In some example embodiments, metadata database 110 is configured to store account object metadata (e.g., account objects used in connection with a replication group object).

Figure 3:
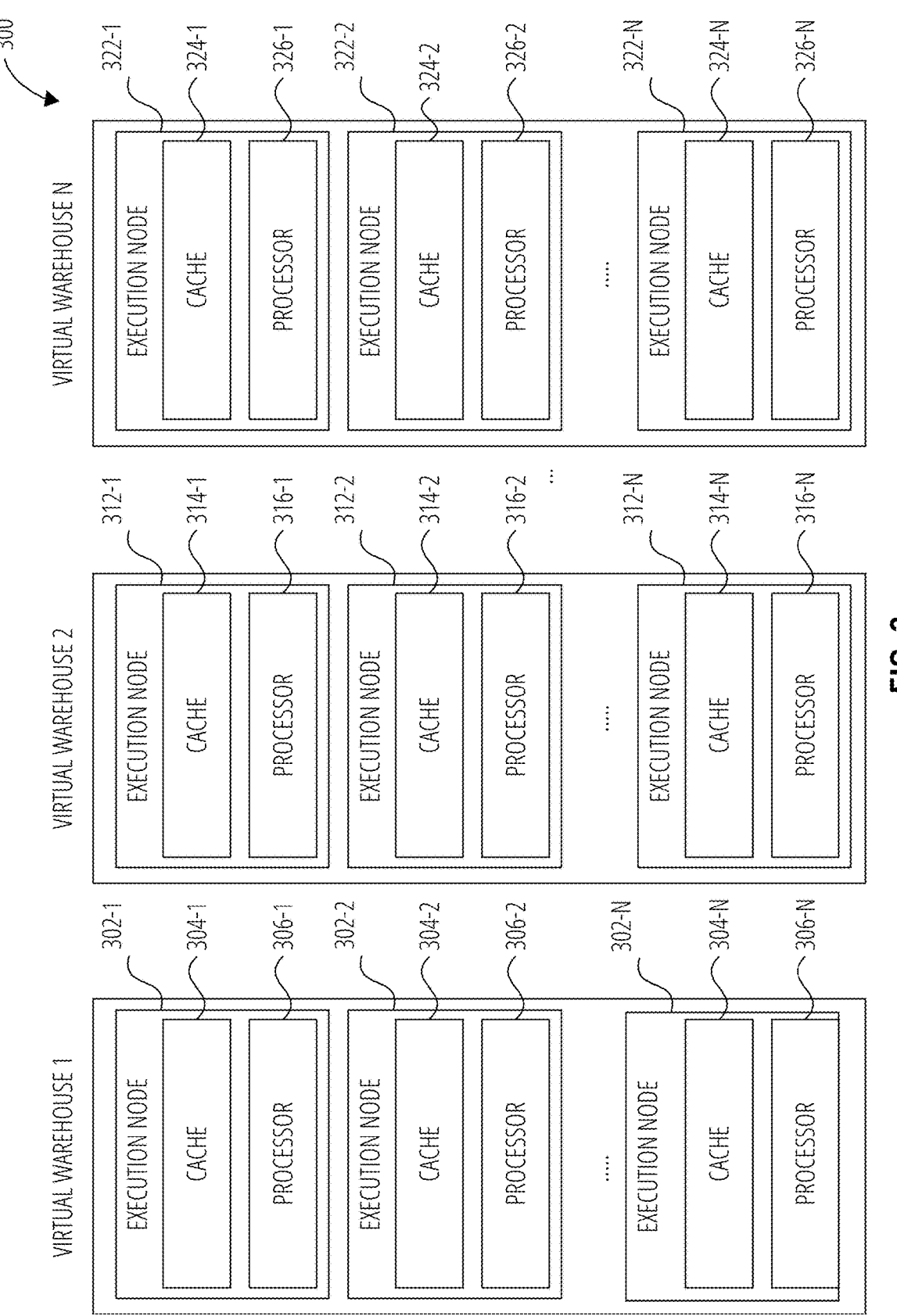
FIG. 3 is a block diagram illustrating components of an execution platform, according to some example embodiments of the present disclosure.

The compute service manager 106 is further coupled to the execution platform 108, which provides multiple computing resources that execute various data storage and data retrieval tasks. As illustrated in FIG. 3, the execution platform 108 comprises a plurality of compute nodes. The execution platform 108 is coupled to storage platform 104 and cloud-storage platforms 120. The storage platform 104 comprises multiple data storage devices 140-1 to 140-N. In some example embodiments, the data storage devices 140-1 to 140-N are cloud-based storage devices located in one or more geographic locations. For example, the data storage devices 140-1 to 140-N may be part of a public cloud infrastructure or a private cloud infrastructure. The data storage devices 140-1 to 140-N may be hard disk drives (HDDs), solid-state drives (SSDs), storage clusters, Amazon S3™ storage systems, or any other data-storage technology. Additionally, the cloud storage platform 104 may include distributed file systems (such as Hadoop Distributed File Systems (HDFS)), object storage systems, and the like. In some example embodiments, at least one internal stage 124 may reside on one or more of the data storage devices 140-1-140-N, and at least one external stage 122 may reside on one or more of the cloud-storage platforms 120.

In some example embodiments, communication links between elements of the computing environment 100 are implemented via one or more data communication networks. These data communication networks may utilize any communication protocol and any type of communication medium. In some example embodiments, the data communication networks are a combination of two or more data communication networks (or sub-networks) coupled to one another. In alternative embodiments, these communication links are implemented using any type of communication medium and any communication protocol.

The compute service manager 106, metadata database(s) 110, execution platform 108, and storage platform 104, are shown in FIG. 1 as individual discrete components. However, each of the compute service manager 106, metadata database(s) 110, execution platform 108, and storage platform 104 may be implemented as a distributed system (e.g., distributed across multiple systems/platforms at multiple geographic locations). Additionally, each of the compute service manager 106, metadata database(s) 110, execution platform 108, and storage platform 104 can be scaled up or down (independently of one another) depending on changes to the requests received and the changing needs of the network-based database system 102. Thus, in the described embodiments, the network-based database system 102 is dynamic and supports regular changes to meet the current data processing needs.

During a typical operation, the network-based database system 102 processes multiple jobs determined by the compute service manager 106. These jobs are scheduled and managed by the compute service manager 106 to determine when and how to execute the job. For example, the compute service manager 106 may divide the job into multiple discrete tasks and may determine what data is needed to execute each of the multiple discrete tasks. The compute service manager 106 may assign each of the multiple discrete tasks to one or more nodes of the execution platform 108 to process the task. The compute service manager 106 may determine what data is needed to process a task and further determine which nodes within the execution platform 108 are best suited to process the task. Some nodes may have already cached the data needed to process the task and, therefore, be a good candidate for processing the task. Metadata stored in a metadata database 110 assists the compute service manager 106 in determining which nodes in the execution platform 108 have already cached at least a portion of the data needed to process the task. One or more nodes in the execution platform 108 process the task using data cached by the nodes and, if necessary, data retrieved from the storage platform 104. It is desirable to retrieve as much data as possible from caches within the execution platform 108 because the retrieval speed is typically much faster than retrieving data from the storage platform 104.

As shown in FIG. 1, the cloud computing platform 126 of the computing environment 100 separates the execution platform 108 from the storage platform 104. In this arrangement, the processing resources and cache resources in the execution platform 108 operate independently of the data storage devices 140-1 to 140-N in the storage platform 104. Thus, the computing resources and cache resources are not restricted to specific data storage devices 140-1 to 140-N. Instead, all computing resources and all cache resources may retrieve data from, and store data to, any of the data storage resources in the storage platform 104.

As also shown, the network-based database system 102 comprises an AI agent-based semantic data update system 130 configured to use one or more AI agents to update semantic data (e.g., a semantic model) as described herein, where the semantic data can enable generation of a structured language data query for a data store (e.g., a database accessible via the network-based database system 102) based on a natural language question. The updated semantic data generated by the AI agent-based semantic data update system 130 can be used, for example, by a natural language query system that receives an input a natural language question from a user, translates the natural language question using the updated semantic data to generate one or more structured language data queries (e.g., SQL queries), and executes those one or more structured language data queries to generate one or more query results, which the natural language query system can use to generate a response (to the user) to the natural language question. Such a natural language query system implemented using the network-based database system 102. Data used by the AI agent-based semantic data update system 130 to update semantic data (e.g., a semantic model) can be stored in a data store (e.g., database) accessible via the network-based database system 102.

Figure 2:
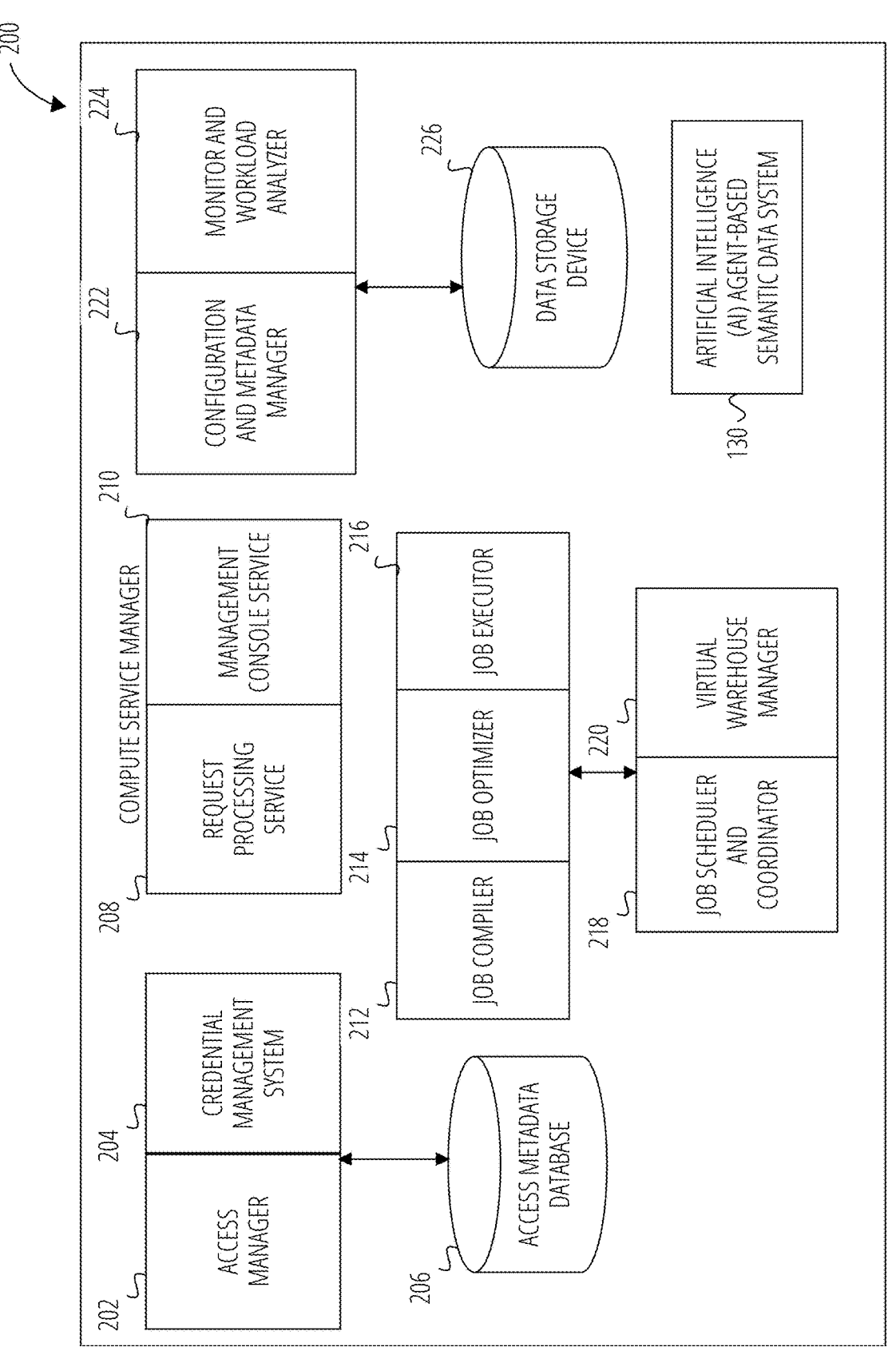
FIG. 2 is a block diagram illustrating components of a compute service manager, according to some example embodiments of the present disclosure.

FIG. 2 is a block diagram 200 illustrating components of the compute service manager 106, according to some example embodiments of the present disclosure. As shown in FIG. 2, the compute service manager 106 includes an access manager 202 and a credential management system 204 coupled to access metadata database 206, which is an example of the metadata database(s) 110. As also shown, the compute service manager 106 can include and implement (at least in part) the AI agent-based semantic data update system 130 described herein.

Access manager 202 handles authentication and authorization tasks for the systems described herein. The credential management system 204 facilitates use of remote stored credentials to access external resources such as data resources in a remote storage device. As used herein, the remote storage devices may also be referred to as "persistent storage devices" or "shared storage devices." For example, the credential management system 204 may create and maintain remote credential store definitions and credential objects (e.g., in the access metadata database 206). A remote credential store definition identifies a remote credential store and includes access information to access security credentials from the remote credential store. A credential object identifies one or more security credentials using non-sensitive information (e.g., text strings) that are to be retrieved from a remote credential store for use in accessing an external resource. When a request invoking an external resource is received at run time, the credential management system 204 and access manager 202 use information stored in the access metadata database 206 (e.g., a credential object and a credential store definition) to retrieve security credentials used to access the external resource from a remote credential store.

A request processing service 208 manages received data storage requests and data retrieval requests (e.g., jobs to be performed on database data). For example, the request processing service execution platform 108 may determine the data to process a received query (e.g., a data storage request or data retrieval request). The data can be stored in a cache within the execution platform 108 or in a data storage device in storage platform 104.

A management console service 210 supports access to various systems and processes by administrators and other system managers. Additionally, the management console service 210 may receive a request to execute a job and monitor the workload on the system.

The compute service manager 106 also includes a job compiler 212, a job optimizer 214, and a job executor 216. The job compiler 212 parses a job into multiple discrete tasks and generates the execution code for each of the multiple discrete tasks. The job optimizer 214 determines the best method to execute the multiple discrete tasks based on the data that needs to be processed. The job optimizer 214 also handles various data pruning operations and other data optimization techniques to improve the speed and efficiency of executing the job. The job executor 216 executes the execution code for jobs received from a queue or determined by the compute service manager 106.

A job scheduler and coordinator 218 sends received jobs to the appropriate services or systems for compilation, optimization, and dispatch to the execution platform 108. For example, jobs can be prioritized and then processed in that prioritized order. In an embodiment, the job scheduler and coordinator 218 determines a priority for internal jobs that are scheduled by the compute service manager 106 with other "outside" jobs such as user queries that can be scheduled by other systems in the database but may utilize the same processing resources in the execution platform 108. In some example embodiments, the job scheduler and coordinator 218 identifies or assigns particular nodes in the execution platform 108 to process particular tasks. A virtual warehouse manager 220 manages the operation of multiple virtual warehouses implemented in the execution platform 108. For example, the virtual warehouse manager 220 may generate query plans for executing received queries.

Additionally, the compute service manager 106 includes a configuration and metadata manager 222, which manages the information related to the data stored in the remote data storage devices and in the local buffers (e.g., the buffers in execution platform 108). The configuration and metadata manager 222 uses metadata to determine which data files need to be accessed to retrieve data for processing a particular task or job. A monitor and workload analyzer 224 oversees processes performed by the compute service manager 106 and manages the distribution of tasks (e.g., workload) across the virtual warehouses and execution nodes in the execution platform 108. The monitor and workload analyzer 224 also redistributes tasks, as needed, based on changing workloads throughout the cloud computing platform 126 and may further redistribute tasks based on a user (e.g., "external") query workload that may also be processed by the execution platform 108. The configuration and metadata manager 222 and the monitor and workload analyzer 224 are coupled to a data storage device 226. Data storage device 226 in FIG. 2 represents any data storage device within the storage platform 104. For example, data storage device 226 may represent buffers in execution platform 108, storage devices in cloud storage platform 104, or any other storage device.

As described in embodiments herein, the compute service manager 106 validates all communication from an execution platform (e.g., the execution platform 108) to validate that the content and context of that communication are consistent with the task(s) known to be assigned to the execution platform. For example, an instance of the execution platform executing a query A should not be allowed to request access to data-source D (e.g., data storage device 226) that is not relevant to query A. Similarly, a given execution node (e.g., execution node 302-1) may need to communicate with another execution node (e.g., execution node 302-2), and should be disallowed from communicating with a third execution node (e.g., execution node 312-1) and any such illicit communication can be recorded (e.g., in a log or other location). Also, the information stored on a given execution node is restricted to data relevant to the current query and any other data is unusable, rendered so by destruction or encryption where the key is unavailable.

FIG. 3 is a block diagram 300 illustrating components of the execution platform 108, according to some example embodiments of the present disclosure. As shown in FIG. 3, the execution platform 108 includes multiple virtual warehouses, including virtual warehouse 1, virtual warehouse 2, and virtual warehouse N. Each virtual warehouse includes multiple execution nodes that each include a data cache and a processor. The virtual warehouses can execute multiple tasks in parallel by using the multiple execution nodes. As discussed herein, the execution platform 108 can add new virtual warehouses and drop existing virtual warehouses in real-time based on the current processing needs of the systems and users. This flexibility allows the execution platform 108 to quickly deploy large amounts of computing resources when needed without being forced to continue paying for those computing resources when they are no longer needed. All virtual warehouses can access data from any data storage device (e.g., any storage device in storage platform 104).

Although each virtual warehouse shown in FIG. 3 includes three execution nodes, a particular virtual warehouse may include any number of execution nodes. Further, the number of execution nodes in a virtual warehouse is dynamic, such that new execution nodes are created when additional demand is present, and existing execution nodes are deleted when they are no longer useful.

Each virtual warehouse is capable of accessing any of the data storage devices 140-1 to 140-N shown in FIG. 1. Thus, the virtual warehouses are not necessarily assigned to a specific data storage device 140-1 to 140-N and, instead, can access data from any of the data storage devices 140-1 to 140-N within the storage platform 104. Similarly, each of the execution nodes shown in FIG. 3 can access data from any of the data storage devices 140-1 to 140-N. In some example embodiments, a particular virtual warehouse or a particular execution node can be temporarily assigned to a specific data storage device, but the virtual warehouse or execution node may later access data from any other data storage device.

In the example of FIG. 3, virtual warehouse 1 includes three execution nodes 302-1, 302-2, and 302-N. Execution node 302-1 includes a cache 304-1 and a processor 306-1. Execution node 302-2 includes a cache 304-2 and a processor 306-2. Execution node 302-N includes a cache 304-N and a processor 306-N. Each execution node 302-1, 302-2, and 302-N is associated with processing one or more data storage and/or data retrieval tasks. For example, a virtual warehouse may handle data storage and data retrieval tasks associated with an internal service, such as a clustering service, a materialized view refresh service, a file compaction service, a storage procedure service, or a file upgrade service. In other implementations, a particular virtual warehouse may handle data storage and data retrieval tasks associated with a particular data storage system or a particular category of data.

Similar to virtual warehouse 1 discussed above, virtual warehouse 2 includes three execution nodes 312-1, 312-2, and 312-N. Execution node 312-1 includes a cache 314-1 and a processor 316-1. Execution node 312-2 includes a cache 314-2 and a processor 316-2. Execution node 312-N includes a cache 314-N and a processor 316-N. Additionally, virtual warehouse N includes three execution nodes 322-1, 322-2, and 322-N. Execution node 322-1 includes a cache 324-1 and a processor 326-1. Execution node 322-2 includes a cache 324-2 and a processor 326-2. Execution node 322-N includes a cache 324-N and a processor 326-N.

In some example embodiments, the execution nodes shown in FIG. 3 are stateless with respect to the data being cached by the execution nodes. For example, these execution nodes do not store or otherwise maintain state information about the execution node, or the data being cached by a particular execution node. Thus, in the event of an execution node failure, the failed node can be transparently replaced by another node. Since there is no state information associated with the failed execution node, the new (replacement) execution node can easily replace the failed node without concern for recreating a particular state.

Although the execution nodes shown in FIG. 3 each includes one data cache and one processor, alternate embodiments may include execution nodes containing any number of processors and any number of caches. Additionally, the caches may vary in size among the different execution nodes. The caches shown in FIG. 3 store, in the local execution node, data that was retrieved from one or more data storage devices in storage platform 104. Thus, the caches reduce or eliminate the bottleneck problems occurring in platforms that consistently retrieve data from remote storage systems. Instead of repeatedly accessing data from the remote storage devices, the systems and methods described herein access data from the caches in the execution nodes, which is significantly faster and avoids the bottleneck problem discussed above. In some example embodiments, the caches are implemented using high-speed memory devices that provide fast access to the cached data. Each cache can store data from any of the storage devices in the storage platform 104.

Further, the cache resources and computing resources may vary between different execution nodes. For example, one execution node may contain significant computing resources and minimal cache resources, making the execution node useful for tasks that require significant computing resources. Another execution node may contain significant cache resources and minimal computing resources, making this execution node useful for tasks that require caching of large amounts of data. Yet another execution node may contain cache resources providing faster input-output operations, useful for tasks that require fast scanning of large amounts of data. In some example embodiments, the cache resources and computing resources associated with a particular execution node are determined when the execution node is created, based on the expected tasks to be performed by the execution node.

Additionally, the cache resources and computing resources associated with a particular execution node may change over time based on changing tasks performed by the execution node. For example, an execution node may be assigned more processing resources if the tasks performed by the execution node become more processor intensive. Similarly, an execution node may be assigned more cache resources if the tasks performed by the execution node require a larger cache capacity.

Although virtual warehouses 1, 2, and N are associated with the same execution platform 108, the virtual warehouses can be implemented using multiple computing systems at multiple geographic locations. For example, virtual warehouse 1 can be implemented by a computing system at a first geographic location, while virtual warehouses 2 and N are implemented by another computing system at a second geographic location. In some example embodiments, these different computing systems are cloud-based computing systems maintained by one or more different entities.

Additionally, each virtual warehouse is shown in FIG. 3 as having multiple execution nodes. The multiple execution nodes associated with each virtual warehouse can be implemented using multiple computing systems at multiple geographic locations. For example, an instance of virtual warehouse 1 implements execution nodes 302-1 and 302-2 on one computing platform at a geographic location and implements execution node 302-N at a different computing platform at another geographic location. Selecting particular computing systems to implement an execution node may depend on various factors, such as the level of resources needed for a particular execution node (e.g., processing resource requirements and cache requirements), the resources available at particular computing systems, communication capabilities of networks within a geographic location or between geographic locations, and which computing systems are already implementing other execution nodes in the virtual warehouse.

Execution platform 108 is also fault tolerant. For example, if one virtual warehouse fails, that virtual warehouse is quickly replaced with a different virtual warehouse at a different geographic location. A particular execution platform 108 may include any number of virtual warehouses. Additionally, the number of virtual warehouses in a particular execution platform is dynamic, such that new virtual warehouses are created when additional processing and/or caching resources are needed. Similarly, existing virtual warehouses can be deleted when the resources associated with the virtual warehouse are no longer useful.

In some example embodiments, the virtual warehouses may operate on the same data in storage platform 104, but each virtual warehouse has its own execution nodes with independent processing and caching resources. This configuration allows requests on different virtual warehouses to be processed independently and with no interference between the requests. This independent processing, combined with the ability to dynamically add and remove virtual warehouses, supports the addition of new processing capacity for new users without impacting the performance.

Figure 4:
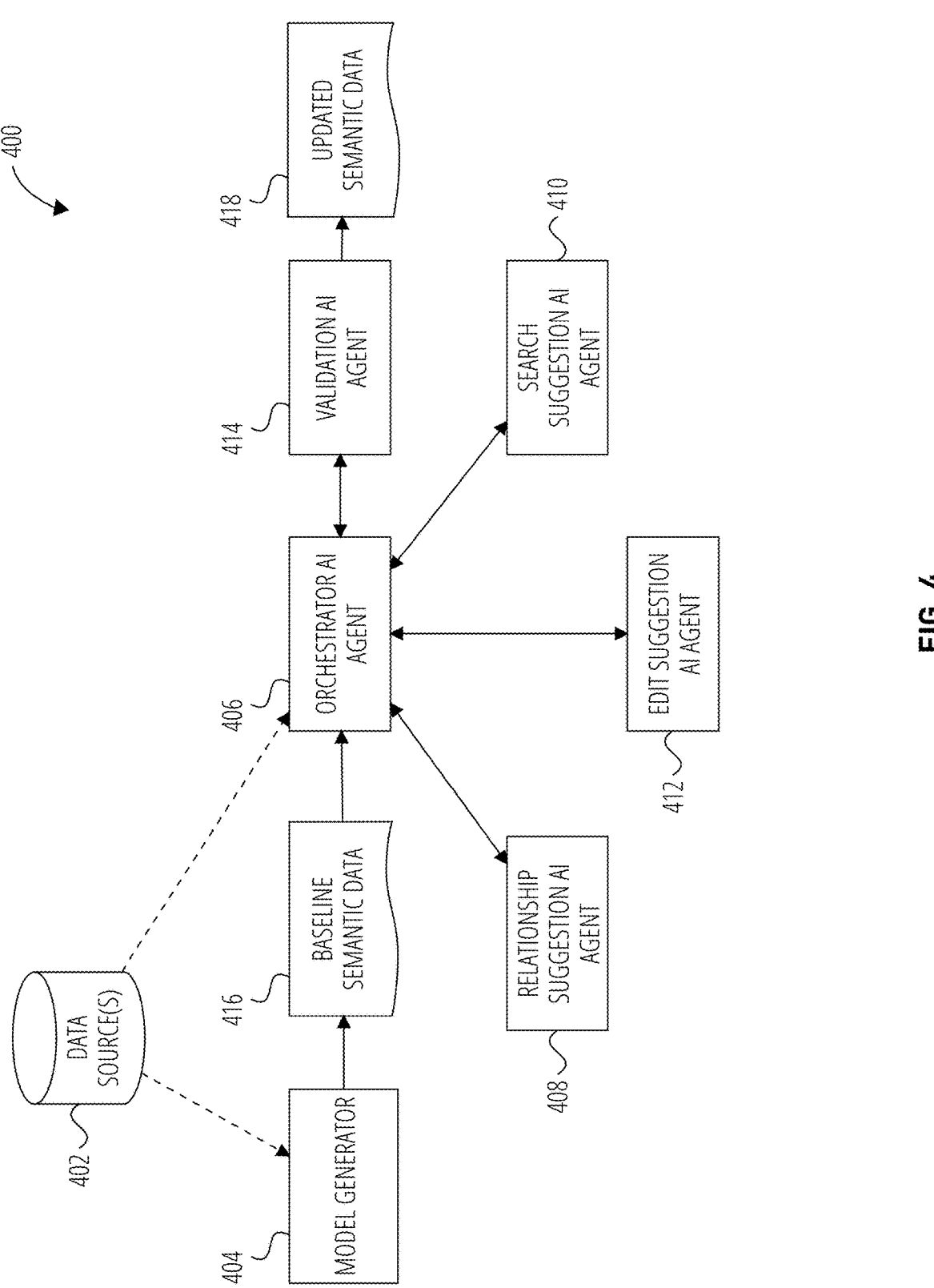
FIG. 4 illustrates an example AI agent-based semantic data update system, according to some example embodiments of the present disclosure.

FIG. 4 illustrates an example AI agent-based semantic data update system 400, according to some example embodiments of the present disclosure. As shown, the AI agent-based semantic data update system 400 comprises a model generator 404, an orchestrator AI agent 406, a relationship suggestion AI agent 408, a search suggestion AI agent 410, an edit suggestion AI agent 412, and a validation AI agent 414. The AI agent-based semantic data update system 400 has access to one or more data sources 402. There is a baseline semantic data 416 and an updated semantic data 418. One or more data sources 402 can provide data to the AI agent-based semantic data update system 400 to facilitate the updating of semantic data (e.g., a given semantic model) including, for example, verified natural language question-structured language data query pairs (e.g., golden pairs of natural language questions and correct SQL queries) associated with one or more data stores (e.g., a target database for which the semantic data will be used to generate structured language data queries), analyst-generated structured language data queries with the one or more data stores, and the like. The one or more data sources 402 can include a golden data source as described herein.

For various example embodiments, the relationship suggestion AI agent 408 analyzes structured language data queries (e.g., golden structured language data queries) from verified natural language question-structured language data query pairs to identify and suggest new relationships between tables in the semantic model. The relationship suggestion AI agent 408 can receive as inputs including verified natural language question-structured language data query pairs and a semantic model with primary keys, and can produce validated relationship suggestions that the relationship suggestion AI agent 408 can incorporate into a latest (or current) version of the baseline semantic data 416 (e.g., baseline semantic model) to generate an updated version of the baseline semantic data 416. The process used by the relationship suggestion AI agent 408 can comprise (e.g., in response to a prompt from the orchestrator AI agent 406) identifying one or more potential relationships, validating and parsing the one or more potential relationships, and generating an updated version of the baseline semantic data 416 with the one or more potential relationships incorporated.

According to some example embodiments, the search suggestion AI agent 410 updates a latest version of the baseline semantic data 416 (e.g., baseline semantic model) to generate an updated version of the baseline semantic data 416 by identifying and suggesting search integrations for appropriate dimensions in the baseline semantic data 416. The search suggestion AI agent 410 can employ a Hyper-LogLog (HLL) algorithm to analyze and estimate cardinality of dimensions in the baseline semantic data 416, identify dimensions with cardinality of interest (e.g., between $10^1$ and $10^6$), and evaluate each verified question-query pair to determine which dimensions would improve query responses. The results can be aggregated by the search suggestion AI agent 410 to generate a list of columns for search integration into the latest version of the baseline semantic data 416.

In some example embodiments, the edit suggestion AI agent 412 analyzes verified natural language question-structured language data query pairs, analyst-generated structured language data queries (e.g., SQL), or both to suggest and incorporate edits to a latest version the baseline semantic data 416. The edit can include, without limitation, additions such as new dimensions, facts, metrics, and filters, and modifications to existing elements like names, descriptions, synonyms, and expressions in the baseline semantic data 416. For example, when analyzing a natural language question regarding "large orders," the edit suggestion AI agent 412 can suggest adding a filter definition where "large order=item_order>20" based on a golden SQL query from a verified pair. For some example embodiments, the edit suggestion AI agent 412 generates one or more custom instructions for structured language data query (e.g., SQL query) generation that can apply to all of the baseline semantic data 416. For example, the edit suggestion AI agent 412 can analyze discrepancies between generated structured language data queries and correct structured language data queries (e.g., golden SQL queries) from verified pairs to generate custom instructions that can bridge the gap between the latest version of the baseline semantic data 416 and a desired output (e.g., domain-specific output).

For some example embodiments, the validation AI agent 414 evaluates and validates changes to a latest version of the baseline semantic data 416. The validation AI agent 414 can do this after an individual AI agent (e.g., relationship suggestion AI agent 408, search suggestion AI agent 410, or edit suggestion AI agent 412) has updated the latest version of the baseline semantic data 416, or after the latest version of the baseline semantic data 416 has been updated by multiple AI agents. The validation AI agent 414 can involve a multi-step evaluation process that compare structured language data queries generated using the latest version of the baseline semantic data 416 to corresponding structured language data queries (e.g., correct SQL queries) from verified natural language question-structured language data query pairs (e.g., golden question-query pairs), and that may also compare query results generated from such structure queries (e.g., to verify if both query results appropriately address corresponding natural language questions. Once the latest version of the baseline semantic data 416, it can be outputted or provided for use (e.g., by a natural language query system) as the updated semantic data 418 (e.g., updated semantic model).

Various example embodiments use the orchestrator AI agent 406 to manage and coordinate use of AI agents (e.g., relationship suggestion AI agent 408, search suggestion AI agent 410, edit suggestion AI agent 412, validation AI agent 414) to update the baseline semantic data 416. The orchestrator AI agent 406 can manage and coordinate use of an individual AI agents by sending one or more prompts to the individual AI agents, where each prompt provides the individual AI agents with instructions that the individual AI agent is to act upon, input data for performing the update (e.g., the latest version of the baseline semantic data 416, verified pairs of natural language questions and structured language data queries, etc.), or a combination of both. The orchestrator AI agent 406 can determine how many iterations of updates (e.g., iterations of an optimization loop) are to be performed on the baseline semantic data 416, select which AI agents are to be used during an iteration, and can determine the order in which AI agents are used during an iteration. When a select AI agent (e.g., relationship suggestion AI agent 408, search suggestion AI agent 410, or edit suggestion AI agent 412) is to be used to update the baseline semantic data 416, the orchestrator AI agent 406 can provide the latest version of the baseline semantic data 416 to the select validation AI agent 414 and can subsequently receive from the select AI agent an updated version of the baseline semantic data 416. The orchestrator AI agent 406 can cause the select AI agent to update the latest version of the baseline semantic data 416 by submitting a prompt to the select AI agent that comprises instructions that cause the select AI agent to start its respective update (e.g., suggestion) process. Depending on the example embodiment, the orchestrator AI agent 406 can track the accuracy of an updated version of the baseline semantic data 416 received from a select AI agent; the accuracy can comprise a value (e.g., 0.0 to 1.0) that represents the translation accuracy (e.g., approximate accuracy) achieved by using the updated version of the baseline semantic data 416. The accuracy of an update version of the baseline semantic data 416 can be provided by the AI agent that last updated the baseline semantic data 416, or can be determined by the orchestrator AI agent 406 after the orchestrator AI agent 406 receives the updated version of the baseline semantic data 416 from the AI agent. For instance, starting with an initial version of the baseline semantic data 416 having an initial accuracy of approximately 0.2, the orchestrator AI agent 406 can cause the relationship suggestion AI agent 408 to apply relationship suggestions to the initial version of the baseline semantic data 416 to improve accuracy of the baseline semantic data 416 to about 0.5, can cause the search suggestion AI agent 410 to implements search suggestions to the latest version of the baseline semantic data 416 (from the relationship suggestion AI agent 408) that cause the baseline semantic data 416 to reach an accuracy of approximately 0.6, and can cause the edit suggestion AI agent 412 to incorporate edit suggestions to the latest version of the baseline semantic data 416 (from the search suggestion AI agent 410) the cause the baseline semantic data 416 to reach an accuracy of approximately 0.8 accuracy. The latest version of the baseline semantic data 416 provided by the edit suggestion AI agent 412 can be evaluated and validated by the validation AI agent 414 and, upon validation, can be provided as updated semantic data 418 (e.g., updated semantic model) to a data system (e.g., natural language query system) that can use the updated semantic data 418 to translate natural language questions to structured language data queries for one or more data stores (e.g., one or more target databases).

Some example embodiments use the model generator 404 to create an initial version of the baseline semantic data 416 (e.g., baseline semantic model) using information from the one or more data sources 402. The initial version of the baseline semantic data 416 can serve as the starting point for the iterative improvement process carried out by the various AI agents at the behest of the orchestrator AI agent 406.

FIG. 5 is a flowchart of an example method 500 for using one or more AI agents to update semantic data, according to some example embodiments of the present disclosure. Method 500 may be embodied in computer-readable instructions for execution by one or more hardware components (e.g., one or more processors) such that the operations of method 500 can be performed by components of the AI agent-based semantic data update system 130 or the network-based database system 102, such as a network node (e.g., the AI agent-based semantic data update system 130 executing on a network node of the compute service manager 106) or a computing device (e.g., client device 112), one or both of which may be implemented as machine 1500 of FIG. 15 performing the disclosed functions. Accordingly, method 500 is described below, by way of example with reference thereto. However, it shall be appreciated that method 500 may be deployed on various other hardware configurations and is not intended to be limited to deployment within the network-based database system 102.

At operation 502, a processor (e.g., implementing the AI agent-based semantic data update system 130) generates an initial version of a baseline semantic model (e.g., representing the initial semantic layer). The processor can generate the initial version of the baseline semantic model by receiving a user selection comprising a schema (e.g., database schema) and specific tables to be included in the baseline semantic model. As described herein, the baseline semantic model can map columns from one or more selected tables to appropriate logical elements based on their data types (e.g., non-time dimensions for categorical values, time dimensions for time/date values, and measure columns for numerical values). The processor can extract metadata and comments from the schema and can use one or more large language models to generate natural language descriptions of tables, views, and columns. The processor can obtain one or more sample values from one or more columns to include in the baseline semantic model. The generated baseline semantic model can be stored in a YAML format file or the like, and can include essential components like descriptive names, relationships between tables, metrics, filters, and synonyms for business terms. The initial version of the baseline semantic model can serve as the foundation that can be further refined and optimized by method 500 to improve its effectiveness in translating natural language questions to structured language data queries.

During operation 504, the processor accesses the initial version of the baseline semantic model that describes a schema of a database (e.g., target database) and that enables a large language model (LLM) to generate structured language data queries for the database based on natural language questions. Additionally, at operation 506, the processor accesses a data source (e.g., golden data source) that comprises a set of verified pairs of natural language questions and structured language data queries.

For operation 508, the processor causes execution of an orchestrator AI agent (e.g., 406) that coordinates a plurality of individual AI agents to update the initial version of the baseline semantic model with one or more improvements. For some example embodiments, a relationship suggestion AI agent (e.g., 408), a search suggestion AI agent (e.g., 410), an edit suggestion AI agent (e.g., 412), and a validation AI agent (e.g., 414). For various example embodiments, at least one of the orchestrator AI agent, the relationship suggestion AI agent, the search suggestion AI agent, the edit suggestion AI agent, or the validation AI agent comprises a large language model (LLM) agent. Depending on the example embodiment, the orchestrator AI agent can cause an individual AI agent (of the plurality of AI agents) by sending or otherwise providing the individual AI agent with a latest version of the baseline semantic model. Additionally, where the individual AI agent comprises (or implemented by) LLM, the orchestrator AI agent can cause the individual AI agent to process and update the latest version of the baseline semantic model by sending a prompt to the individual AI agent, where the prompt comprises instructions and information relevant to the processing/updating. More regarding the operations of the orchestrator AI agent and individual AI agents is illustrated and described with respect to FIG. 6, FIG. 7, FIG. 8, FIG. 9, and FIG. 10.

Figure 6:
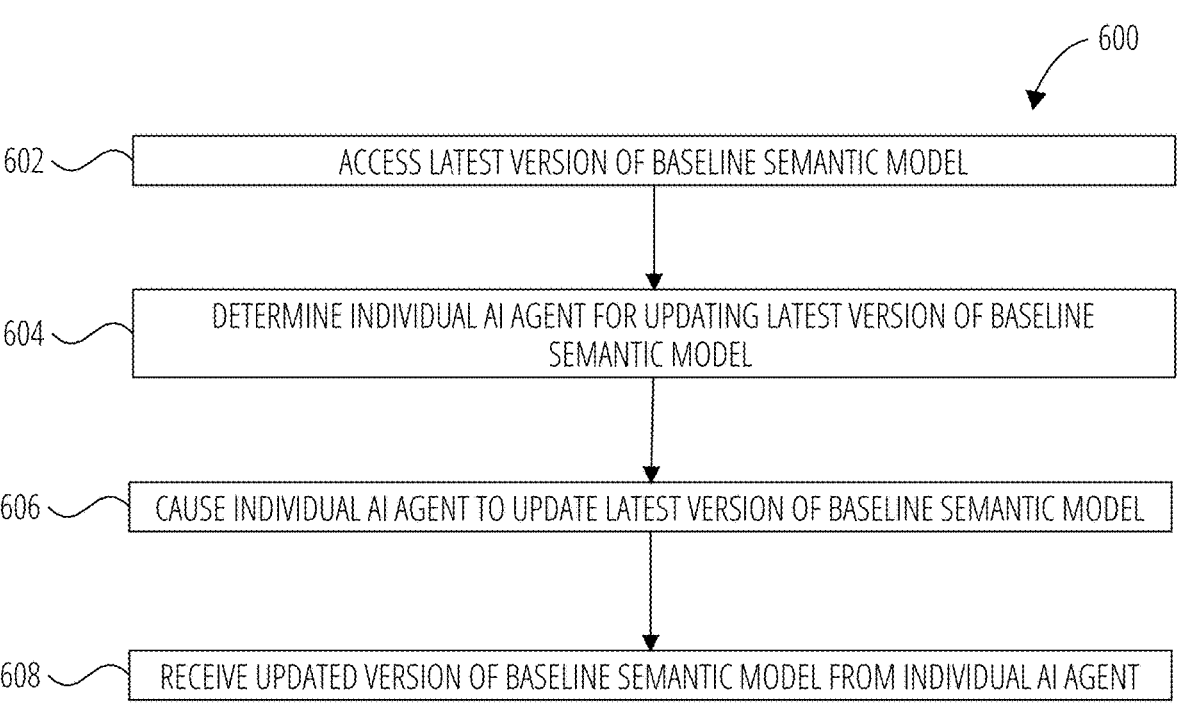
FIG. 6 is a flowchart of an example method for an orchestrator AI agent, according to some example embodiments of the present disclosure.

FIG. 6 is a flowchart of an example method 600 for an orchestrator AI agent, according to some example embodiments of the present disclosure. Method 600 may be embodied in computer-readable instructions for execution by one or more hardware components (e.g., one or more processors) such that the operations of method 600 can be performed by components an orchestrator AI agent of the AI agent-based semantic data update system 130 or AI agent-based semantic data update system 400, which can be implemented by a network node (e.g., the orchestrator AI agent 406 executing on a network node of the compute service manager 106) or a computing device (e.g., client device 112), one or both of which may be implemented as machine 1500 of FIG. 15 performing the disclosed functions. Accordingly, method 600 is described below, by way of example with reference thereto. However, it shall be appreciated that method 600 may be deployed on various other hardware configurations and is not intended to be limited to deployment within the network-based database system 102.

At operation 602, an orchestrator AI agent (e.g., implementing by a processor) accesses a latest version of a baseline semantic model, which can be an initial version of the baseline semantic model or an updated version of the baseline semantic model received from one of the AI agents (of the plurality of AI agents) that last updated the baseline semantic model.

During operation 604, the orchestrator AI agent determines (e.g., selects), from the plurality of AI agents, an individual AI agent for updating the latest version of the baseline semantic model. As described herein, the orchestrator AI agent can implement an optimization loop, where the orchestrator AI agent which different AI agents are used to update the latest version of the baseline semantic model and the order in which the AI agents are selected for use. The optimization loop can involve determining the accuracy of the latest version of baseline semantic model after an individual AI agent has completed its update.

Thereafter, at operation 606, the orchestrator AI agent causes the individual AI agent (determined during operation 604) to update the latest version of the baseline semantic model. According to various example embodiments, the orchestrator AI agent provides a copy of the latest version of the baseline semantic model to the individual AI agent. Additionally, for some example embodiments, where the individual AI agent comprises (or is implemented by an LLM), the orchestrator AI agent generates an appropriate prompt that instructs the individual AI agent to update the latest version of the baseline semantic model, and sends the prompt to the individual AI agent. The copy of the latest version of the baseline semantic model can be provided with or as part of the prompt sent to the individual AI agent.

Eventually, at operation 608, the orchestrator AI agent receives, from the individual AI agent, an updated version of the baseline semantic model, which represents the latest version of the baseline semantic model after being updated by the individual AI agent. This updated version of the baseline semantic model can become the latest version of the baseline semantic model, and can be submitted by the orchestrator AI agent to another individual AI agent (of the plurality of AI agents) for further processing (e.g., updates or validation).

FIG. 7 is a flowchart of an example method 700 for a relationship suggestion AI agent, according to some example embodiments of the present disclosure. Method 700 may be embodied in computer-readable instructions for execution by one or more hardware components (e.g., one or more processors) such that the operations of method 700 can be performed by components a relationship suggestion AI agent of the AI agent-based semantic data update system 130 or AI agent-based semantic data update system 400, which can be implemented by a network node (e.g., the relationship suggestion AI agent 408 executing on a network node of the compute service manager 106) or a computing device (e.g., client device 112), one or both of which may be implemented as machine 1500 of FIG. 15 performing the disclosed functions. Accordingly, method 700 is described below, by way of example with reference thereto. However, it shall be appreciated that method 700 may be deployed on various other hardware configurations and is not intended to be limited to deployment within the network-based database system 102.

At operation 702, a relationship suggestion AI agent (e.g., implemented by a processor) receives, from an orchestrator AI agent, a latest version of the baseline semantic model. During operation 704, the relationship suggestion AI agent determines one or more table relationship suggestions for the received version of the baseline semantic model based on analyzing one or more structured language data query patterns in the set of verified pairs. For some example embodiments, operation 704 comprises the relationship suggestion AI agent analyzing the one or more structured language data query patterns in the set of verified pairs, and generating a prompt based on the received version of the baseline semantic model and the set of verified pairs. The prompt can comprise one or more instructions for determining the one or more table relationship suggestions for the received version of the baseline semantic model based on the analysis. The one or more instructions of the prompt can comprise at least one of: an instruction to identify one or more join paths in at least one structured language data query in the set of verified pairs; an instruction to deduplicate the one or more join paths; or an instruction to generate, as part of the output, one or more table relationship definitions identified based on the deduplicated one or more join paths. For some example embodiments, operation 604 comprises the relationship suggestion AI agent generating, by a select LLM, an output based on the prompt, where at least one table relationship suggestion of the one or more table relationship suggestions is determined based on the output. Eventually, at operation 706, the relationship suggestion AI agent updates the received version of the baseline semantic model based on the one or more table relationship suggestions.

FIG. 8 is a flowchart of an example method for a search suggestion AI agent, according to some example embodiments of the present disclosure. Method 800 may be embodied in computer-readable instructions for execution by one or more hardware components (e.g., one or more processors) such that the operations of method 800 can be performed by components a search suggestion AI agent of the AI agent-based semantic data update system 130 or AI agent-based semantic data update system 400, which can be implemented by a network node (e.g., the search suggestion AI agent 410 executing on a network node of the compute service manager 106) or a computing device (e.g., client device 112), one or both of which may be implemented as machine 1500 of FIG. 15 performing the disclosed functions. Accordingly, method 800 is described below, by way of example with reference thereto. However, it shall be appreciated that method 800 may be deployed on various other hardware configurations and is not intended to be limited to deployment within the network-based database system 102.

At operation 802, a search suggestion AI agent (e.g., implemented by a processor) receives, from an orchestrator AI agent, a latest version of the baseline semantic model. During operation 804, the search suggestion AI agent determines one or more searchable suggestions for the received version of the baseline semantic model based on dimension cardinality. According to various example embodiments, operation 804 comprises the search suggestion AI agent determining a set of approximate cardinalities for a set of dimensions within the given version of the baseline semantic model (e.g., using an HLL algorithm), and filtering the set of dimensions based on the set of approximate cardinalities to generate a filtered set of dimensions (e.g., filtering for cardinality between specific range). Based on one or more pairs (e.g., each pair) of the set of verified pairs, the search suggestion AI agent can generate a first prompt that comprises one or more instructions to determine, for each individual pair of the one or more pairs, one or more dimensions of the filtered set of dimensions that help answer an individual natural language question of the individual pair. The search suggestion AI agent can generate, by a select LLM, a first output based on the first prompt, and generate a second prompt comprising one or more instructions to aggregate one or more results from the first output and generate a second output, where the second output comprises a list of columns. The search suggestion AI agent can then generate, by the select LLM, the second output based on the second prompt, where at least one searchable dimension suggestion of the one or more searchable dimension suggestions is determined based on the list of columns from the second output. Eventually, at operation 806, the search suggestion AI agent updates the received version of the baseline semantic model based on the one or more searchable dimension suggestions.

Figure 9:
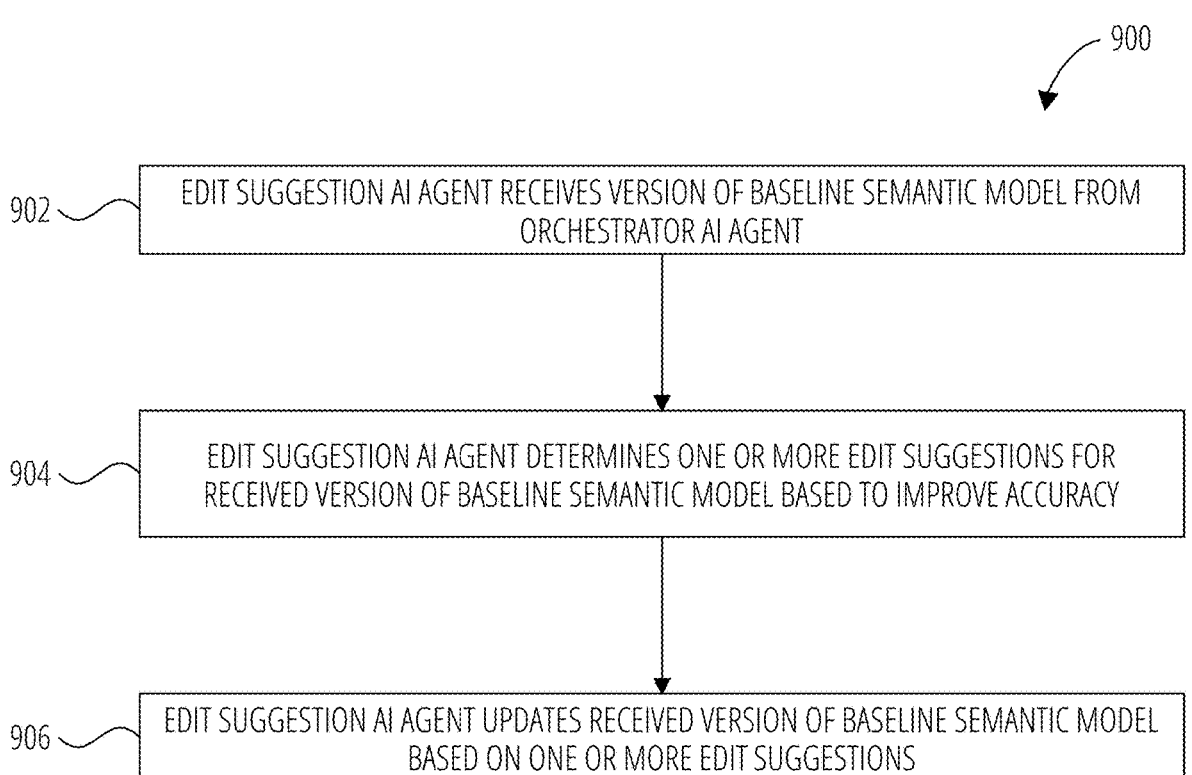
FIG. 9 is a flowchart of an example method for an edit suggestion AI agent, according to some example embodiments of the present disclosure.

FIG. 9 is a flowchart of an example method for an edit suggestion AI agent, according to some example embodiments of the present disclosure. Method 900 may be embodied in computer-readable instructions for execution by one or more hardware components (e.g., one or more processors) such that the operations of method 900 can be performed by components an edit suggestion AI agent of the AI agent-based semantic data update system 130 or AI agent-based semantic data update system 400, which can be implemented by a network node (e.g., the edit suggestion AI agent 412 executing on a network node of the compute service manager 106) or a computing device (e.g., client device 112), one or both of which may be implemented as machine 1500 of FIG. 15 performing the disclosed functions. Accordingly, method 900 is described below, by way of example with reference thereto. However, it shall be appreciated that method 900 may be deployed on various other hardware configurations and is not intended to be limited to deployment within the network-based database system 102.

At operation 902, an edit suggestion AI agent (e.g., implemented by a processor) receives, from an orchestrator AI agent, a latest version of the baseline semantic model. During operation 904, the edit suggestion AI agent determines one or more searchable suggestions for the received version of the baseline semantic model to improve accuracy of the received version of the baseline semantic model. According to various example embodiments, operation 904 comprises the edit suggestion AI agent generating a prompt that comprises one or more instructions to analyze the received version of the baseline semantic model for one or more discrepancies and determine one or more proposed edits to the received version of the baseline semantic model based on a resulting analysis. Depending on the example embodiment, the one or more edit suggestions can comprise at least one of: an addition of a dimension to the individual version of the baseline semantic model; an addition of a fact to the individual version of the baseline semantic model; an addition of a metric to the individual version of the baseline semantic model; an addition of a filter to the individual version of the baseline semantic model; a name change in the individual version of the baseline semantic model; a description change in the individual version of the baseline semantic model; a synonym change in the individual version of the baseline semantic model; or an expression change in the individual version of the baseline semantic model. The edit suggestion AI agent can then generate, by a select LLM, an output based on the prompt, where at least one edit suggestion of the one or more edit suggestions is determined based on the one or more proposed edits from the output.

Additionally, for some example embodiments, operation 902 comprises the edit suggestion AI agent generating, based on one or more existing custom instructions from the received version of the baseline semantic model, a prompt that comprises one or more instructions to update the one or more existing custom instructions. The edit suggestion AI agent can then generate, by the select LLM, an output based on the prompt, where at least one edit suggestion of the one or more edit suggestions comprises updating at least one existing custom instruction in the individual version of the baseline semantic model based on the at least one updated custom instruction.

Eventually, at operation 906, the edit suggestion AI agent updates the received version of the baseline semantic model based on the one or more edit suggestions.

FIG. 10 is a flowchart of an example method for a validation AI agent, according to some example embodiments of the present disclosure. Method 1000 may be embodied in computer-readable instructions for execution by one or more hardware components (e.g., one or more processors) such that the operations of method 1000 can be performed by components a validation AI agent of the AI agent-based semantic data update system 130 or AI agent-based semantic data update system 400, which can be implemented by a network node (e.g., the validation AI agent 414 executing on a network node of the compute service manager 106) or a computing device (e.g., client device 112), one or both of which may be implemented as machine 1500 of FIG. 15 performing the disclosed functions. Accordingly, method 1000 is described below, by way of example with reference thereto. However, it shall be appreciated that method 1000 may be deployed on various other hardware configurations and is not intended to be limited to deployment within the network-based database system 102.

At operation 1002, the validation AI agent (e.g., implemented by a processor) tracks accuracy improvement achieved by an individual AI agent (e.g., relationship suggestion AI agent 408, search suggestion AI agent 410, edit suggestion AI agent 412) after the individual AI agent updates the latest version of the baseline semantic model. The accuracy improvement can comprise a value (e.g., between 0.0 and 1.0) and be determined and provided by the individual AI agent, or determined by the validation AI agent.

At operation 1004, the validation AI agent receives, from an orchestrator AI agent, a latest version of the baseline semantic model. During operation 1006, the validation AI agent performs an evaluation process on the received version of the baseline semantic model to analyze and validate one or more updates applied to the received version of the baseline semantic model. According to various example embodiments, the evaluation process comprises the validation AI agent generating, by an individual LLM, an example structured language data query for a select natural language question from an individual verified pair of the set of verified pairs, where the example structured language data query is generated by the individual LLM based on (e.g., using) the received version of the baseline semantic model. The validation AI agent can determine (e.g., by comparing) whether a set of columns of the example structured language data query are different from a set of columns of a correct structured language data query from the individual verified pair. In response to the validation AI agent determining that the set of columns of the example structured language data query are not different from the set of columns of the correct structured language data query, the validation AI agent can indicate that the example structured language data query is valid.

However, in response to the validation AI agent determining that the set of columns of the example structured language data query are different from the set of columns of the correct structured language data query, the validation AI agent can generate a first query result from the database based on the example structured language data query, and generate a second query result from the database based on a correct structured language data query from the individual verified pair. The validation AI agent can then use a select LLM to determine (e.g., by comparing data frames) whether the first query result and the second query result are equivalent (e.g., even if the results are formatted differently). For example, two different structured language data queries might return the same "most expensive product" but in different formats and still be equivalent. In response to the validation AI agent determining that the first query result and the second query result are equivalent, the validation AI agent can indicate that the example structured language data query is valid and, thereafter, can provide the received version of the baseline semantic model for use by a system (e.g., natural language query system). However, in response to the validation AI agent determining that the first query result and the second query result are not equivalent, the validation AI agent can indicate that the example structured language data query is not valid.

The validation AI agent can perform the evaluation process with respect to the natural language question and the correct structured language data query each of two or more verified pairs (e.g., each verified pair) from a set of verified pairs (e.g., golden pairs). According to some example embodiments, if the latest version of the baseline semantic model received by the validation AI agent passed for each of the two or more verified pairs, the validation AI agent can deem the latest version of the baseline semantic model valid and available for use by a system (e.g., by a natural language query system). However, if the validation AI agent determines that the number of example structured language data queries determined to be invalid surpasses a predetermined threshold (e.g., the current accuracy level of the latest version of the baseline semantic model is below 0.8), the latest version of baseline semantic model can be deemed to be invalid. Where the latest version of baseline semantic model is deemed to be invalid, the latest version of baseline semantic model can be returned to the orchestrator AI agent for further updates (e.g., improvements).

FIG. 11A, FIG. 11B, FIG. 12A, FIG. 12B, FIG. 13A, FIG. 13B, FIG. 14A, and FIG. 14B illustrate example edit suggestions generated for semantic data, according to some example embodiments of the present disclosure.

Figure 11A:
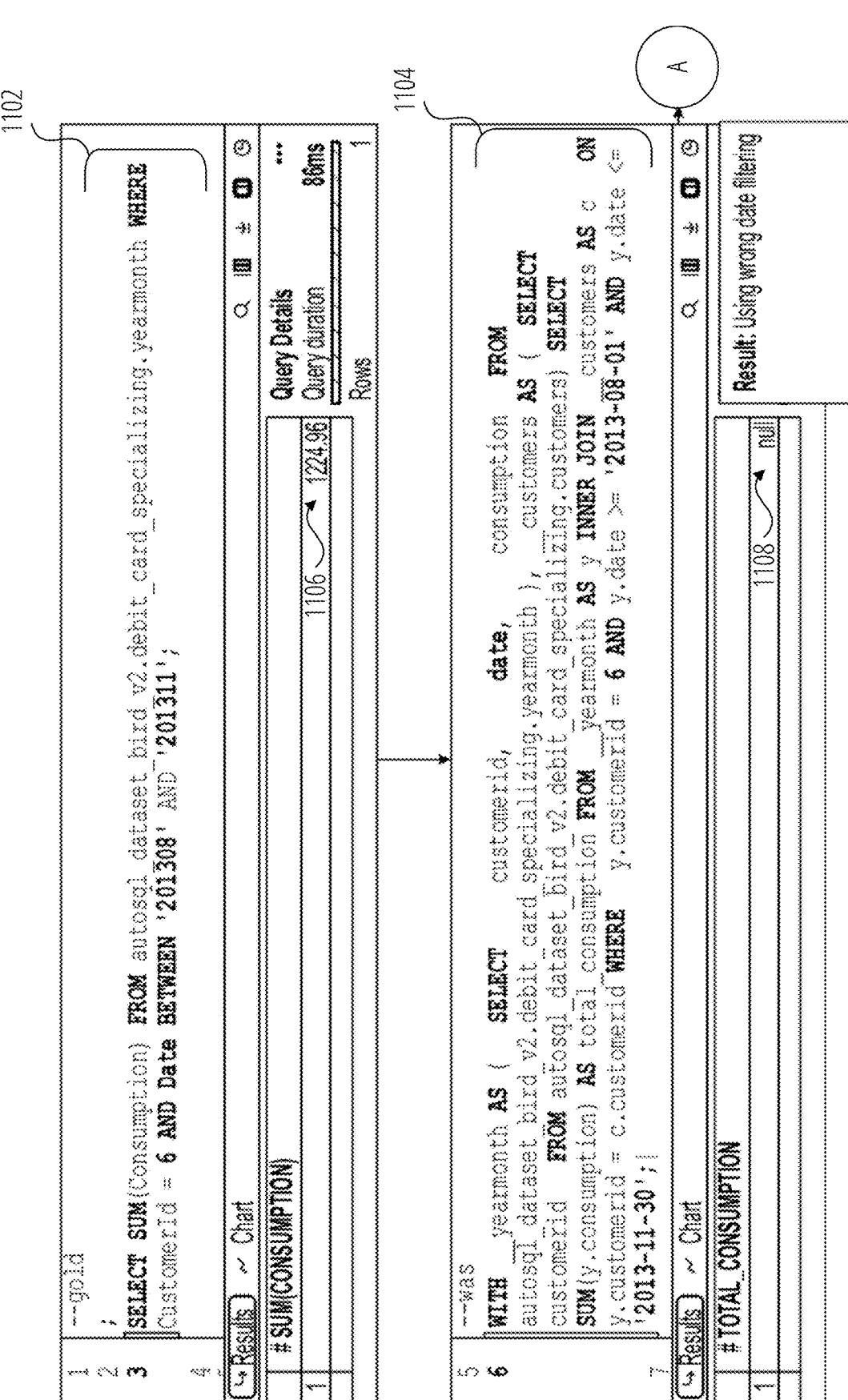
FIG. 11A, FIG. 11B, FIG. 12A, FIG. 12B, FIG. 13A, FIG. 13B, FIG. 14A, and FIG. 14B illustrate example edit suggestions generated for semantic data, according to some example embodiments of the present disclosure.

Referring now to FIG. 11A, one or more edit suggestions 1110 represent example edit suggestions generated by an edit suggestion AI agent (e.g., 412) for a version of a baseline semantic data (e.g., baseline semantic model). FIG. 11A shows a correct structured language data query 1102 (e.g., golden SQL query) from a verified pair of a natural language question and a structured language data query, where the natural language question comprises "How much did customer 6 consume in total between August and November 2013? Between August And November 2013 refers to Between 201308 And 201311; The first 4 strings of the Date values in the yearmonth table can represent year; The 5th and 6th string of the date can refer to month." FIG. 11A also shows an example of a pre-update-generated structured language data query 1104 that was generated (e.g., by a select LLM) based on a version of baseline semantic data (e.g., a latest version of the baseline semantic model received by the edit suggestion AI agent) prior to the edit suggestion AI agent updating the baseline semantic data. Query result 1106 represents the result generated when the correct structured language data query 1102 is executed (e.g., by network-based database system 102) on an applicable data store (e.g., a target database), and query result 1108 represents the result generated when the pre-update-generated structured language data query 1104 is executed (e.g., by network-based database system 102) on the same applicable data store (e.g., the same target database). As shown, query result 1106 (for the correct structured language data query 1102) comprises a numerical value, whereas query result 1108 comprises a null value (e.g., no value determined), which can be due to the pre-update-generated structured language data query 1104 using the wrong date filtering.

Figure 11B:
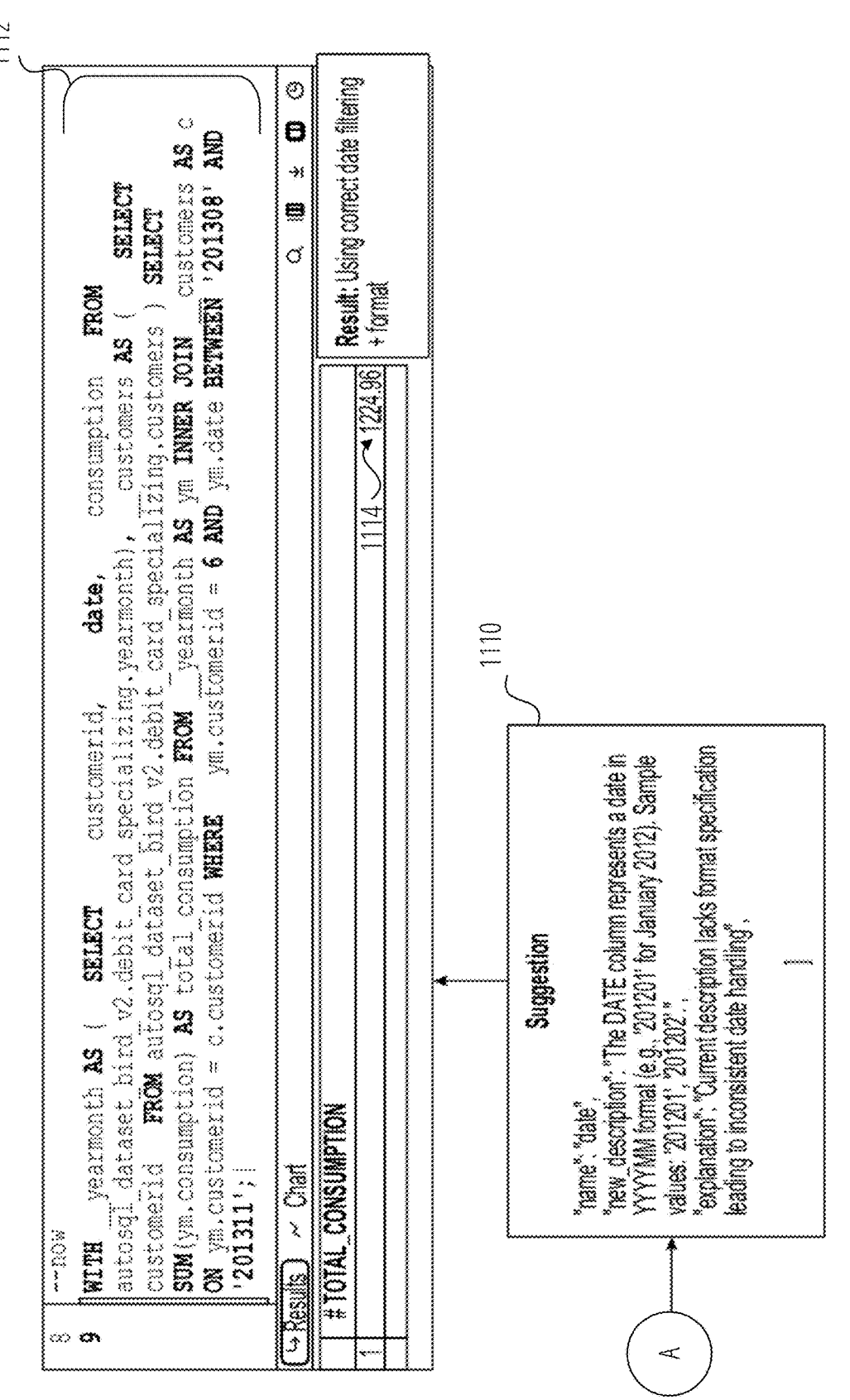

Referring now to FIG. 11B, after the edit suggestion AI agent (e.g., 412) generates and incorporates the one or more edit suggestions 1110 (specifically, adding/changing a "date" metric with a "new description" and an "explanation") into the latest version of the baseline semantic data the edit suggestion AI agent receives (e.g., from the orchestrator AI agent 406), the updated version of the baseline semantic data that results can be used (e.g., by the select LLM) to generate post-update-generated structured language data query 1112. Query result 1114 represents the result generated when the post-update-generated structured language data query 1112 is executed (e.g., by network-based database system 102) on the applicable data store (e.g., the target database). As shown, the query result 1114 (for the post-update-generated structured language data query 1112) comprises a numerical value, and that numerical value matches the numerical value of the query result 1106 generated for the correct structured language data query 1102 (due to the post-update-generated structured language data query 1112 including the correct date filtering).

Figure 12A:
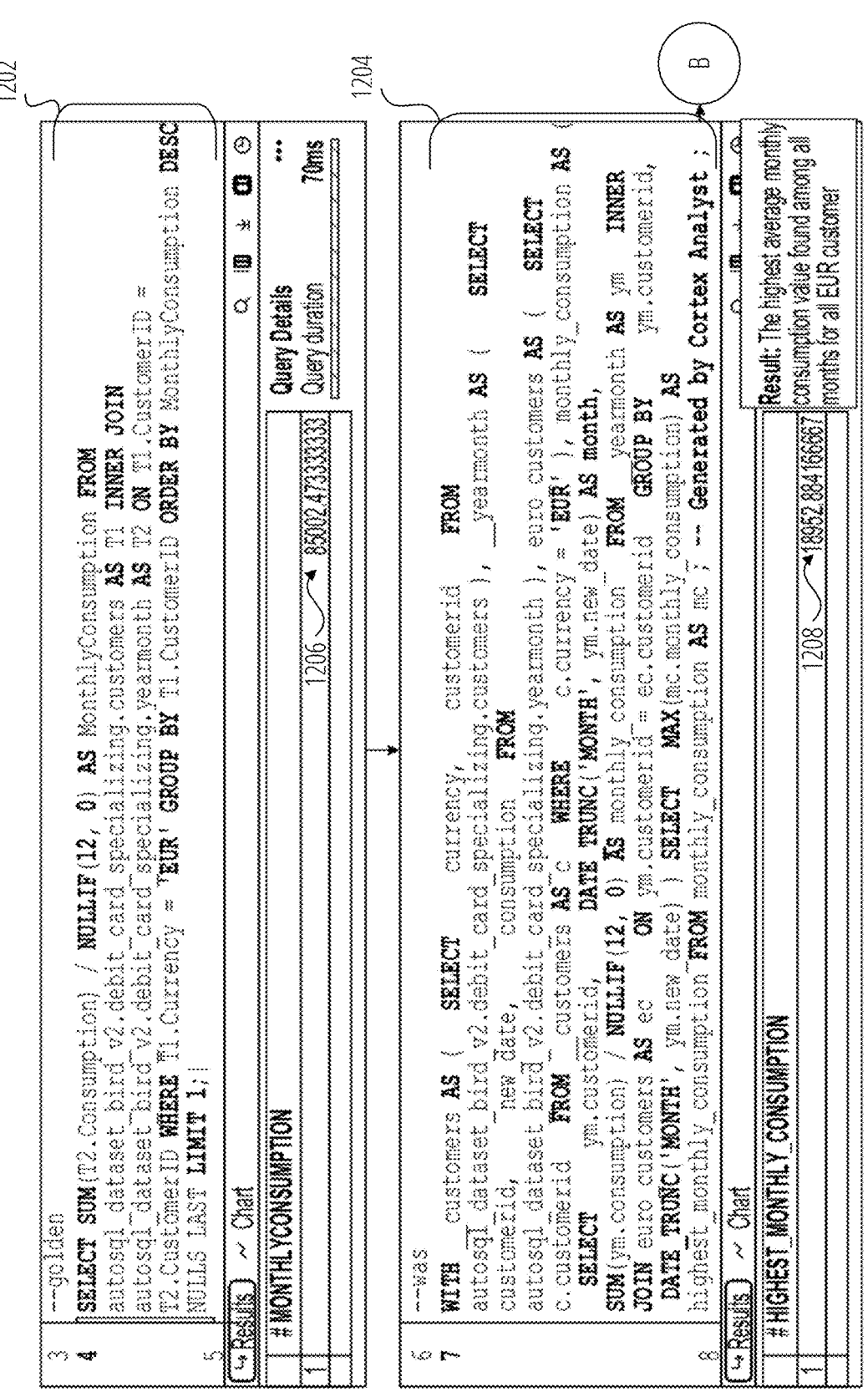

Referring now to FIG. 12A, one or more edit suggestions 1210 represent example edit suggestions generated by an edit suggestion AI agent (e.g., 412) for a version of a baseline semantic data (e.g., baseline semantic model). FIG. 12A shows a correct structured language data query 1202 (e.g., golden SQL query) from a verified pair of a natural language question and a structured language data query, where the natural language question comprises "What is the biggest monthly consumption of the customers who use euro as their currency?" FIG. 12A also shows an example of a pre-update-generated structured language data query 1204 that was generated (e.g., by a select LLM) based on a version of baseline semantic data (e.g., a latest version of the baseline semantic model received by the edit suggestion AI agent) prior to the edit suggestion AI agent updating the baseline semantic data. Query result 1206 represents the result generated when the correct structured language data query 1202 is executed (e.g., by network-based database system 102) on an applicable data store (e.g., a target database), and query result 1208 represents the result generated when the pre-update-generated structured language data query 1204 is executed (e.g., by network-based database system 102) on the same applicable data store (e.g., the same target database). As shown, query result 1206 (for the correct structured language data query 1202) comprises a numerical value, whereas query result 1208 comprises a different numerical value, which can be due to the pre-update-generated structured language data query 1204 querying for the wrong information (specifically, querying for the highest average monthly consumption value found among all months for all EUR customers).

Figure 12B:
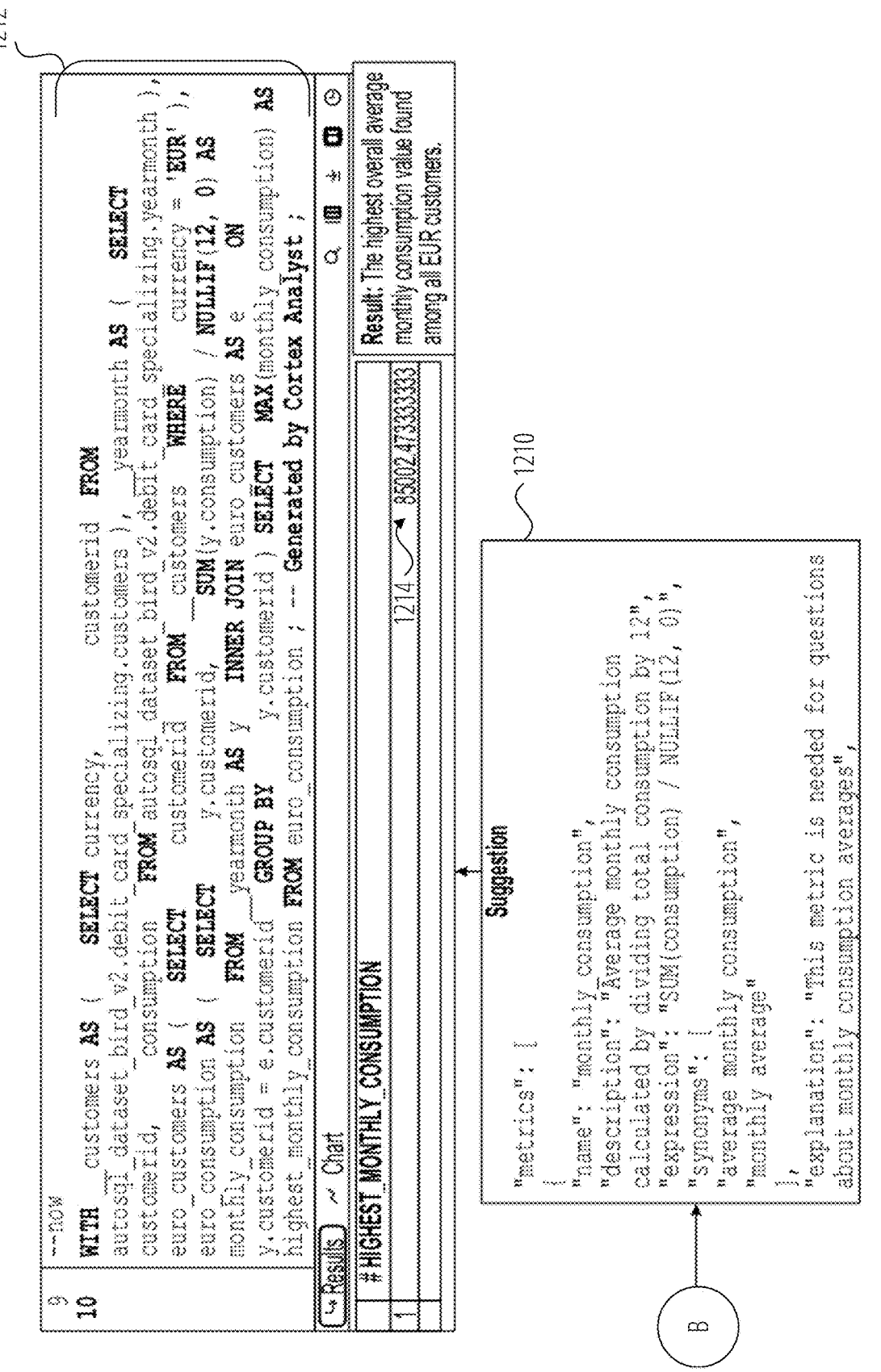

Referring now to FIG. 12B, after the edit suggestion AI agent (e.g., 412) generates and incorporates the one or more edit suggestions 1210 (specifically, adding/changing a "monthly_consumption" metric with a "description," an "expression," "synonyms," and an "explanation") into the latest version of the baseline semantic data the edit suggestion AI agent receives (e.g., from the orchestrator AI agent 406), the updated version of the baseline semantic data that results can be used (e.g., by the select LLM) to generate post-update-generated structured language data query 1212. Query result 1214 represents the result generated when the post-update-generated structured language data query 1212 is executed (e.g., by network-based database system 102) on the applicable data store (e.g., the target database). As shown, the query result 1214 (for the post-update-generated structured language data query 1212) comprises a numerical value, and that numerical value matches the numerical value of the query result 1206 generated for the correct structured language data query 1202 (due to the post-update-generated structured language data query 1212 querying for the highest overall average monthly consumption value found among all EUR customers).

Figure 13A:
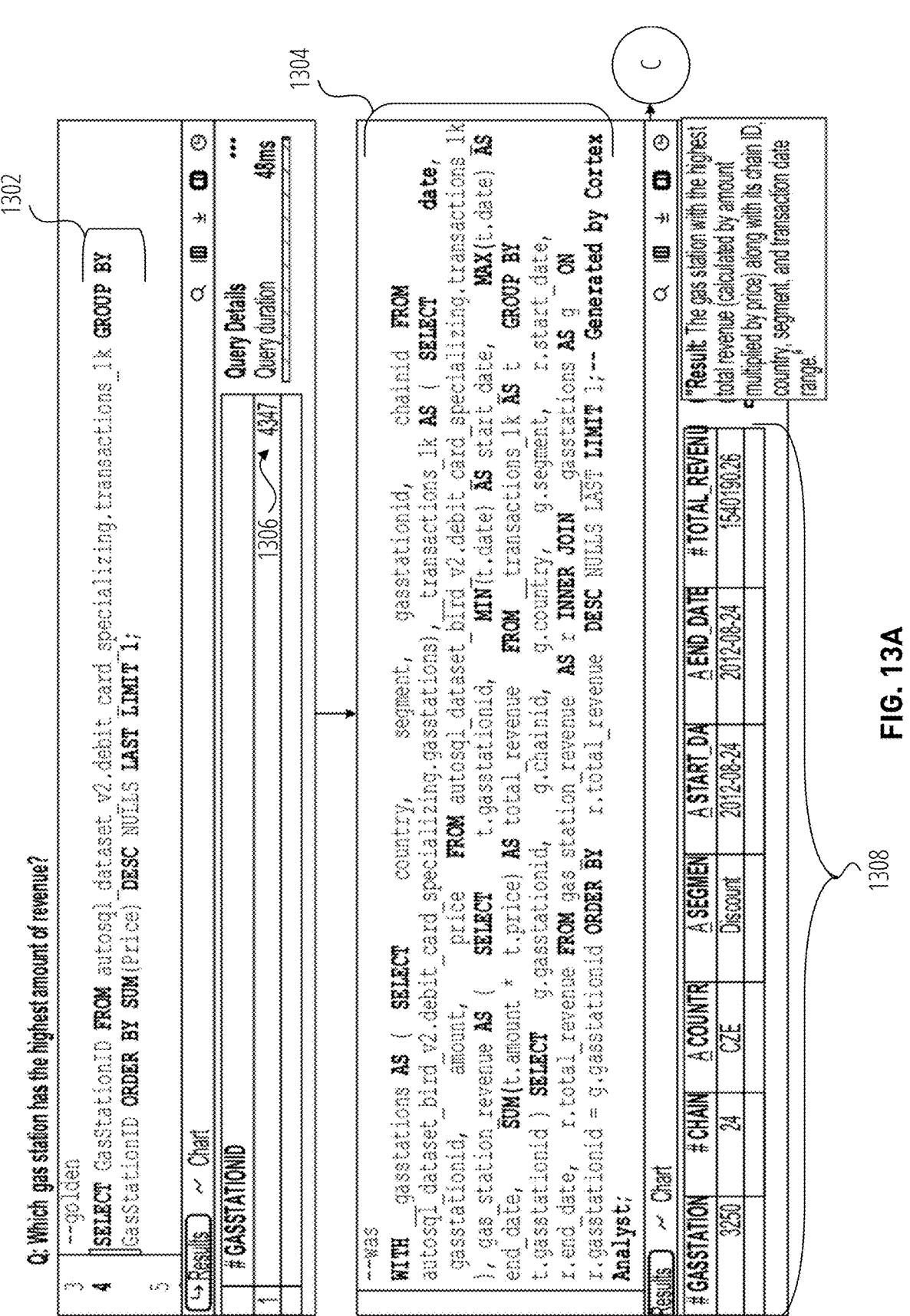

Referring now to FIG. 13A, one or more edit suggestions 1310 represent example edit suggestions generated by an edit suggestion AI agent (e.g., 412) for a version of a baseline semantic data (e.g., baseline semantic model). FIG. 13A shows a correct structured language data query 1302 (e.g., golden SQL query) from a verified pair of a natural language question and a structured language data query, where the natural language question comprises "Which gas station has the highest amount of revenue?" FIG. 13A also shows an example of a pre-update-generated structured language data query 1304 that was generated (e.g., by a select LLM) based on a version of baseline semantic data (e.g., a latest version of the baseline semantic model received by the edit suggestion AI agent) prior to the edit suggestion AI agent updating the baseline semantic data. Query result 1306 represents the result generated when the correct structured language data query 1302 is executed (e.g., by network-based database system 102) on an applicable data store (e.g., a target database), and query result 1308 represents the result generated when the pre-update-generated structured language data query 1304 is executed (e.g., by network-based database system 102) on the same applicable data store (e.g., the same target database). As shown, query result 1306 (for the correct structured language data query 1302) comprises a numerical value, whereas query result 1308 comprises an entire data row that does not include the same numerical value, which can be due to the pre-update-generated structured language data query 1304 querying for the wrong information (specifically, querying for the gas station with the highest total revenue (calculated by amount multiplied by price) along with its chain ID, country, segment, and transaction date range).

Figure 13B:
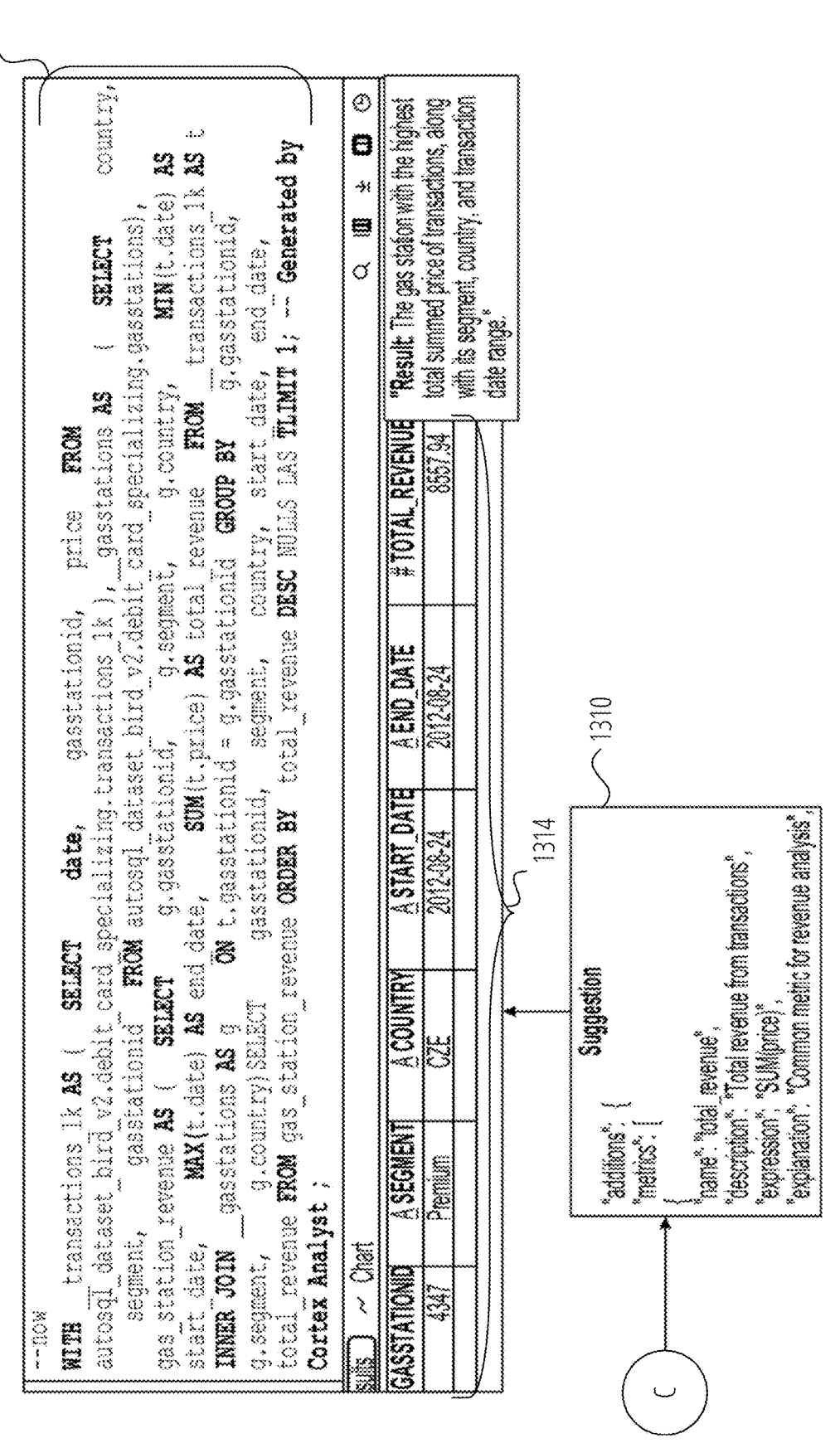

Referring now to FIG. 13B, after the edit suggestion AI agent (e.g., 412) generates and incorporates the one or more edit suggestions 1310 (specifically, adding/changing a "total_revenue" metric with a "description," an "expression," and an "explanation") into the latest version of the baseline semantic data the edit suggestion AI agent receives (e.g., from the orchestrator AI agent 406), the updated version of the baseline semantic data that results can be used (e.g., by the select LLM) to generate post-update-generated structured language data query 1312. Query result 1314 represents the result generated when the post-update-generated structured language data query 1312 is executed (e.g., by network-based database system 102) on the applicable data store (e.g., the target database). As shown, the query result 1314 (for the post-update-generated structured language data query 1312) comprises a data row that includes a numerical value, and that numerical value matches the numerical value of the query result 1306 generated for the correct structured language data query 1302 (due to the post-update-generated structured language data query 1312 querying for the gas station with the highest total summed prices of transactions, along with its segment, country, and transaction date range).

Figure 14A:
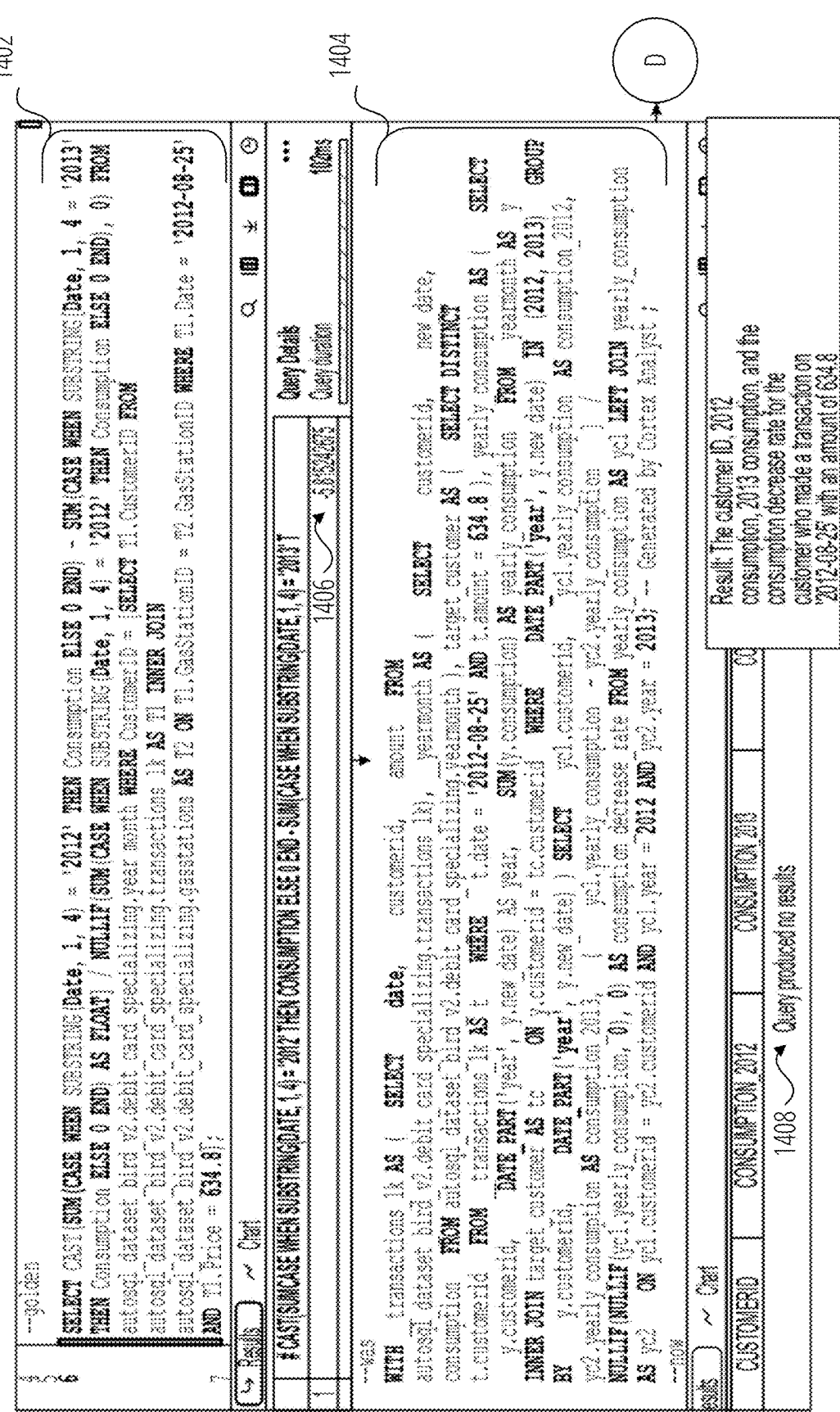
Figure 14B:
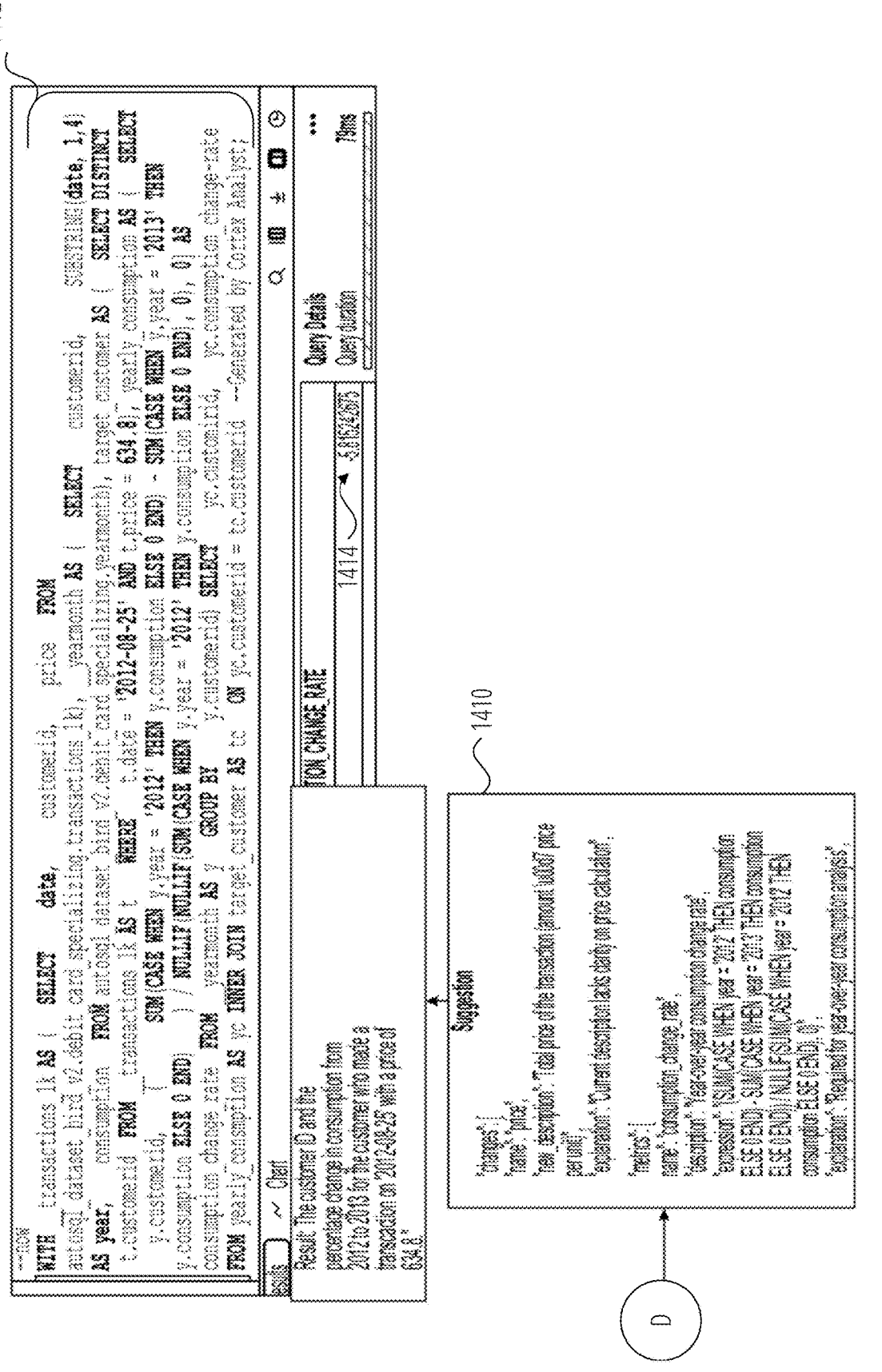

Referring now to FIG. 14A and FIG. 14B, one or more edit suggestions 1410 represent example edit suggestions generated by an edit suggestion AI agent (e.g., 412) for a version of a baseline semantic data (e.g., baseline semantic model). FIG. 14A shows a correct structured language data query 1402 (e.g., golden SQL query) from a verified pair of a natural language question and a structured language data query, where the natural language question comprises "For the customer who paid 634.8 in 2012 Aug. 25, what was the consumption decrease rate from Year 2012 to 2013? '2012 Aug. 24' can be represented by '2012 Aug. 24'; Consumption decrease rate=(consumption_2012-consumption_2013)/consumption_2012." FIG. 14A also shows an example of a pre-update-generated structured language data query 1404 that was generated (e.g., by a select LLM) based on a version of baseline semantic data (e.g., a latest version of the baseline semantic model received by the edit suggestion AI agent) prior to the edit suggestion AI agent updating the baseline semantic data. Query result 1406 represents the result generated when the correct structured language data query 1402 is executed (e.g., by network-based database system 102) on an applicable data store (e.g., a target database), and query result 1408 represents the result generated when the pre-update-generated structured language data query 1404 is executed (e.g., by network-based database system 102) on the same applicable data store (e.g., the same target database). As shown, query result 1406 (for the correct structured language data query 1402) comprises a numerical value, whereas query result 1408 comprises no result, which can be due to the pre-update-generated structured language data query 1404 querying for the wrong information (specifically, querying for the customer ID, 2012 consumption, 2013 consumption, and the consumption decrease rate for the customer who made a transaction on '2010 Aug. 25' with an amount of 634.8).

Referring now to FIG. 14B, after the edit suggestion AI agent (e.g., 412) generates and incorporates the one or more edit suggestions 1410 (specifically, adding/changing a "price" metric and a "consumption_change_rate" metric) into the latest version of the baseline semantic data the edit suggestion AI agent receives (e.g., from the orchestrator AI agent 406), the updated version of the baseline semantic data that results can be used (e.g., by the select LLM) to generate post-update-generated structured language data query 1412. Query result 1414 represents the result generated when the post-update-generated structured language data query 1412 is executed (e.g., by network-based database system 102) on the applicable data store (e.g., the target database). As shown, the query result 1414 (for the post-update-generated structured language data query 1412) comprises a data row that includes a numerical value, and that numerical value matches the numerical value of the query result 1406 generated for the correct structured language data query 1402 (due to the post-update-generated structured language data query 1412 querying for the customer ID and the percentage change in consumption from 2012 to 2013 for the customer who made a transaction on '2012 Aug. 25' with a price of 634.8).

Figure 15:
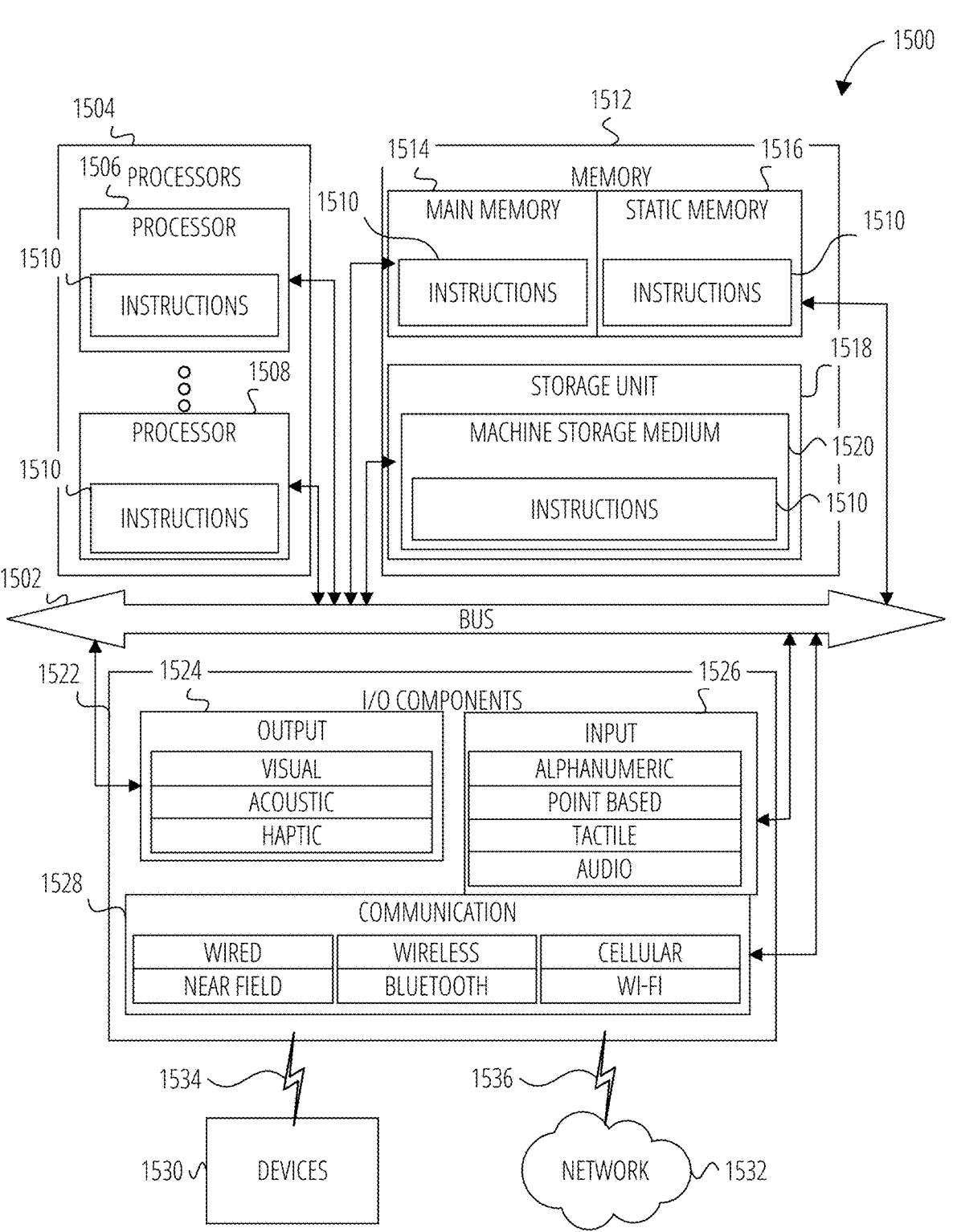
FIG. 15 illustrates a diagrammatic representation of a machine in the form of a computer system within which a set of instructions can be executed for causing the machine to perform any one or more of the methodologies discussed herein, according to some example embodiments of the present disclosure.

FIG. 15 illustrates a diagrammatic representation of a machine 1500 in the form of a computer system within which a set of instructions can be executed for causing the machine 1500 to perform any one or more of the methodologies discussed herein, according to some example embodiments of the present disclosure. Specifically, FIG. 15 shows a diagrammatic representation of the machine 1500 in the example form of a computer system, within which instructions 1510 (e.g., software, a program, an application, an applet, an app, or other executable code) for causing the machine 1500 to perform any one or more of the methodologies discussed herein can be executed. For example, the instructions 1510 may cause the machine 1500 to execute any one or more operations of any one or more of the methods described herein. As another example, the instructions 1510 may cause the machine 1500 to implement portions of the data flows described herein. In this way, the instructions 1510 transform a general, non-programmed machine into a particular machine 1500 (e.g., the compute service manager 106, the execution platform 108, client device 112) that is specially configured to carry out any one of the described and illustrated functions in the manner described herein.

In alternative embodiments, the machine 1500 operates as a standalone device or can be coupled (e.g., networked) to other machines. In a networked deployment, the machine 1500 may operate in the capacity of a server machine or a client machine in a server-client network environment, or as a peer machine in a peer-to-peer (or distributed) network environment. The machine 1500 may comprise, but not be limited to, a server computer, a client computer, a personal computer (PC), a tablet computer, a laptop computer, a netbook, a smart phone, a mobile device, a network router, a network switch, a network bridge, or any machine capable of executing the instructions 1510, sequentially or otherwise, that specify actions to be taken by the machine 1500. Further, while only a single machine 1500 is illustrated, the term "machine" shall also be taken to include a collection of machines machine 1500 that individually or jointly execute the instructions 1510 to perform any one or more of the methodologies discussed herein.

The machine 1500 includes processors 1504, memory 1512, and input/output (I/O) components 1522 configured to communicate with each other such as via a bus 1502. In an example embodiment, the processors 1504 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 1506 and a processor 1508 that may execute the instructions 1510. The term "processor" is intended to include multi-core processors 1504 that may comprise two or more independent processors (sometimes referred to as "cores") that may execute instructions 1510 contemporaneously. Although FIG. 15 shows multiple processors 1504, the machine 1500 may include a single processor with a single core, a single processor with multiple cores (e.g., a multi-core processor), multiple processors with a single core, multiple processors with multiple cores, or any combination thereof.

The memory 1512 may include a main memory 1514, a static memory 1516, and a storage unit 1518, all accessible to the processors 1504 such as via the bus 1502. The main memory 1514, the static memory 1516, and the storage unit 1518 comprising a machine storage medium 1520 may store the instructions 1510 embodying any one or more of the methodologies or functions described herein. The instructions 1510 may also reside, completely or partially, within the main memory 1514, within the static memory 1516, within the storage unit 1518, within at least one of the processors 1504 (e.g., within the processor's cache memory), or any suitable combination thereof, during execution thereof by the machine 1500.

The I/O components 1522 include components to receive input, provide output, produce output, transmit information, exchange information, capture measurements, and so on. The specific I/O components 1522 that are included in a particular machine 1500 will depend on the type of machine. For example, portable machines such as mobile phones will likely include a touch input device or other such input mechanisms, while a headless server machine will likely not include such a touch input device. It will be appreciated that the I/O components 1522 may include many other components that are not shown in FIG. 15. The I/O components 1522 are grouped according to functionality merely for simplifying the following discussion and the grouping is in no way limiting. In various example embodiments, the I/O components 1522 may include output components 1524 and input components 1526. The output components 1524 may include visual components (e.g., a display such as a plasma display panel (PDP), a light emitting diode (LED) display, a liquid crystal display (LCD), a projector, or a cathode ray tube (CRT)), acoustic components (e.g., speakers), other signal generators, and so forth. The input components 1526 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

Communication can be implemented using a wide variety of technologies. The I/O components 1522 may include communication components 1528 operable to couple the machine 1500 to a network 1532 via a coupling 1536 or to devices 1530 via a coupling 1534. For example, the communication components 1528 may include a network interface component or another suitable device to interface with the network 1532. In further examples, the communication components 1528 may include wired communication components, wireless communication components, cellular communication components, and other communication components to provide communication via other modalities. The devices 1530 can be another machine or any of a wide variety of peripheral devices (e.g., a peripheral device coupled via a universal serial bus (USB)). For example, as noted above, the machine 1500 may correspond to any client device, the compute service manager 106, the execution platform 108, and the devices 1530 may include any other of these systems and devices.

The various memories (e.g., 1512, 1514, 1516, and/or memory of the processor(s) 1504 and/or the storage unit 1518) may store one or more sets of instructions 1510 and data structures (e.g., software) embodying or utilized by any one or more of the methodologies or functions described herein. These instructions 1510, when executed by the processor(s) 1504, cause various operations to implement the disclosed embodiments.

As used herein, the terms "machine-storage medium," "device-storage medium," and "computer-storage medium" mean the same thing and can be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage medium," "computer-storage medium," and "device-storage medium" specifically exclude carrier waves, modulated data signals, and other such media, at least some of which are covered under the term "signal medium" discussed below.

In various example embodiments, one or more portions of the network 1532 can be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 1532 or a portion of the network 1532 may include a wireless or cellular network, and the coupling 1536 can be a Code Division Multiple Access (CDMA) connection, a Global System for Mobile communications (GSM) connection, or another type of cellular or wireless coupling. In this example, the coupling 1536 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 1510 can be transmitted or received over the network 1532 using a transmission medium via a network interface device (e.g., a network interface component included in the communication components 1528) and utilizing any one of a number of well-known transfer protocols (e.g., hypertext transfer protocol (HTTP)). Similarly, the instructions 1510 can be transmitted or received using a transmission medium via the coupling 1534 (e.g., a peer-to-peer coupling) to the devices 1530. The terms "transmission medium" and "signal medium" mean the same thing and can be used interchangeably in this disclosure. The terms "transmission medium" and "signal medium" shall be taken to include any intangible medium that is capable of storing, encoding, or carrying the instructions 1510 for execution by the machine 1500, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The various operations of example methods described herein may be performed, at least partially, by one or more processors that are temporarily configured (e.g., by software) or permanently configured to perform the relevant operations. Similarly, the methods described herein may be at least partially processor-implemented. For example, at least some of the operations of the disclosed methods may be performed by one or more processors. The performance of certain operations may be distributed among the one or more processors, not only residing within a single machine but also deployed across several machines. In some example embodiments, the processor or processors may be located in a single location (e.g., within a home environment, an office environment, or a server farm), while in other embodiments the processors may be distributed across several locations.

Described implementations of the subject matter can include one or more features, alone or in combination as illustrated below by way of examples.

Example 1 is a system comprising: at least one hardware processor; and at least one memory storing instructions that cause the at least one hardware processor to perform operations comprising: accessing a baseline semantic model that describes a schema of a database and that enables a large language model to generate structured language data queries for the database based on natural language questions; accessing a data source that comprises a set of verified pairs of natural language questions and structured language data queries; and causing execution of an orchestrator artificial intelligence (AI) agent that coordinates a plurality of individual AI agents to update the baseline semantic model with one or more improvements, the plurality of individual AI agents comprising: a relationship suggestion AI agent that receives a select version of the baseline semantic model from the orchestrator AI agent, determines one or more table relationship suggestions for the select version of the baseline semantic model based on analyzing one or more structured language data query patterns in the set of verified pairs, and updates the select version of the baseline semantic model based on the one or more table relationship suggestions; a search suggestion AI agent that receives a given version of the baseline semantic model from the orchestrator AI agent, determines one or more searchable dimension suggestions for the given version of the baseline semantic model based on dimension cardinality, and updates the given version of the baseline semantic model based on the one or more searchable dimension suggestions; an edit suggestion AI agent that receives an individual version of the baseline semantic model from the orchestrator AI agent, determines one or more edit suggestions for the individual version of the baseline semantic model to improve accuracy of the individual version of the baseline semantic model, and updates the individual version of the baseline semantic model; and a validation AI agent that receives a subsequent version of the baseline semantic model, and performs an evaluation process on the subsequent version of the baseline semantic model to analyze and validate one or more updates applied to the subsequent version of the baseline semantic model.

In Example 2, the subject matter of Example 1 includes, wherein at least one of the orchestrator AI agent, the relationship suggestion AI agent, the search suggestion AI agent, the edit suggestion AI agent, or the validation AI agent comprises a LLM agent.

In Example 3, the subject matter of Examples 1-2 includes, wherein the relationship suggestion AI agent determines the one or more table relationship suggestions for the select version of the baseline semantic model based on the analyzing of the one or more structured language data query patterns in the set of verified pairs by: generating a prompt based on the baseline semantic model and the set of verified pairs, the prompt comprising one or more instructions for determining the one or more table relationship suggestions for the select version of the baseline semantic model based on the analyzing of the one or more structured language data query patterns in the set of verified pairs; and generating, by a select LLM, an output based on the prompt, at least one table relationship suggestion of the one or more table relationship suggestions being determined based on the output.

In Example 4, the subject matter of Example 3 includes, wherein the one or more instructions of the prompt comprise at least one of: a first instruction to identify one or more join paths in at least one structured language data query in the set of verified pairs; a second instruction to deduplicate the one or more join paths; or a third instruction to generate, as part of the output, one or more table relationship definitions identified based on the deduplicated one or more join paths.

In Example 5, the subject matter of Examples 1~4 includes, wherein the search suggestion AI agent determines the one or more searchable dimension suggestions for the given version of the baseline semantic model based on dimension cardinality by: determining a set of approximate cardinalities for a set of dimensions within the given version of the baseline semantic model; filtering the set of dimensions based on the set of approximate cardinalities to generate a filtered set of dimensions; based on one or more pairs of the set of verified pairs, generating a first prompt that comprises one or more instructions to determine, for each individual pair of the one or more pairs, one or more dimensions of the filtered set of dimensions that help answer an individual natural language question of the individual pair; generating, by a select LLM, a first output based on the first prompt; generating a second prompt that comprises one or more instructions to aggregate one or more results from the first output and generate a second output that comprises a list of columns; and generating, by the select LLM, the second output based on the second prompt, at least one searchable dimension suggestion of the one or more searchable dimension suggestions being determined based on the list of columns from the second output.

In Example 6, the subject matter of Examples 1-5 includes, wherein the edit suggestion AI agent determines one or more edit suggestions for the individual version of the baseline semantic model to improve accuracy of the individual version of the baseline semantic model by: generating a prompt that comprises one or more instructions to analyze the individual version of the baseline semantic model for one or more discrepancies and determine one or more proposed edits to the individual version of the baseline semantic model based on a resulting analysis; and generating, by a select LLM, an output based on the prompt, at least one edit suggestion of the one or more edit suggestions being determined based on the one or more proposed edits from the output.

In Example 7, the subject matter of Examples 1-6 includes, wherein the one or more edit suggestions comprise at least one of: an addition of a dimension to the individual version of the baseline semantic model; an addition of a fact to the individual version of the baseline semantic model; an addition of a metric to the individual version of the baseline semantic model; an addition of a filter to the individual version of the baseline semantic model; a name change in the individual version of the baseline semantic model; a description change in the individual version of the baseline semantic model; a synonym change in the individual version of the baseline semantic model; or an expression change in the individual version of the baseline semantic model.

In Example 8, the subject matter of Examples 1-7 includes, wherein the edit suggestion AI agent determines one or more edit suggestions for the individual version of the baseline semantic model to improve accuracy of the individual version of the baseline semantic model by: based on one or more existing custom instructions from the individual version of the baseline semantic model, generating a prompt that comprises one or more instructions to update the one or more existing custom instructions; and generating, by a select LLM, an output based on the prompt, the output comprising at least one updated custom instruction, at least one edit suggestion of the one or more edit suggestions comprising updating at least one existing custom instruction in the individual version of the baseline semantic model based on the at least one updated custom instruction.

In Example 9, the subject matter of Examples 1-8 includes, wherein the evaluation process performed by the validation AI agent performs comprises: based on the subsequent version of the baseline semantic model, generating, by an individual LLM, an example structured language data query for a select natural language question from an individual verified pair of the set of verified pairs; determining whether a set of columns of the example structured language data query are different from a set of columns of a correct structured language data query from the individual verified pair; and in response to determining that the set of columns of the example structured language data query are not different from the set of columns of the correct structured language data query, indicating that the example structured language data query is valid.

In Example 10, the subject matter of Example 9 includes, wherein the evaluation process performed by the validation AI agent performs comprises: in response to determining that the set of columns of the example structured language data query are different from the set of columns of the correct structured language data query: generating a first query result from the database based on the example structured language data query; generating a second query result from the database based on a correct structured language data query from the individual verified pair; using a select LLM to determine whether the first query result and the second query result are equivalent; and in response to determining that the first query result and the second query result are equivalent, indicating that the example structured language data query is valid.

In Example 11, the subject matter of Examples 1-10 includes, wherein the validation AI agent tracks an accuracy improvement achieved by an individual AI agent of the plurality of AI agents after the individual AI agent updates a latest version of the baseline semantic model.

In Example 12, the subject matter of Examples 1-11 includes, wherein the orchestrator AI agent coordinates the plurality of individual AI agents to update the baseline semantic model with the one or more improvements using an iterative loop, wherein the orchestrator AI agent selects which one or more AI agents of the plurality of AI agents are used to update the baseline semantic model during an individual iteration of the iterative loop, and wherein the orchestrator AI agent selects an order in which the one or more AI agents are used to update the baseline semantic model during the individual iteration of the iterative loop.

In Example 13, the subject matter of Example 12 includes, wherein the orchestrator AI agent determines how many iterations of the iterative loop are performed.

Example 14 is a method to implement any of Examples 1-13.

Example 15 is a machine-storage medium, the machine-storage medium including instructions that when executed by a machine, cause the machine to perform operations to implement any of Examples 1-13.

Although the embodiments of the present disclosure have been described concerning specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various example embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is disclosed. Thus, although specific embodiments have been illustrated and described herein, it should be appreciated that any arrangement calculated to achieve the same purpose may be substituted for the specific embodiments shown. This disclosure is intended to cover any adaptations or variations of various example embodiments. Combinations of the above embodiments, and other embodiments not specifically described herein, will be apparent, to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

What is claimed is:

1. A system comprising:
at least one hardware processor; and
at least one memory storing instructions that cause the at least one hardware processor to perform operations comprising:
accessing a baseline semantic model that describes a schema of a database and that enables a large language model (LLM) to generate structured language data queries for the database based on natural language questions;
accessing a data source that comprises a set of verified pairs of natural language questions and structured language data queries; and causing execution of an orchestrator artificial intelligence (AI) agent that coordinates a plurality of individual AI agents to update the baseline semantic model with one or more improvements, the plurality of individual AI agents comprising:
a relationship suggestion AI agent that receives a select version of the baseline semantic model from the orchestrator AI agent, determines one or more table relationship suggestions for the select version of the baseline semantic model based on analyzing one or more structured language data query patterns in the set of verified pairs, and updates the select version of the baseline semantic model based on the one or more table relationship suggestions;
a search suggestion AI agent that receives a given version of the baseline semantic model from the orchestrator AI agent, determines one or more searchable dimension suggestions for the given version of the baseline semantic model based on dimension cardinality, and updates the given version of the baseline semantic model based on the one or more searchable dimension suggestions;
an edit suggestion AI agent that receives an individual version of the baseline semantic model from the orchestrator AI agent, determines one or more edit suggestions for the individual version of the baseline semantic model to improve accuracy of the individual version of the baseline semantic model, and updates the individual version of the baseline semantic model; and
a validation AI agent that receives a subsequent version of the baseline semantic model, and performs an evaluation process on the subsequent version of the baseline semantic model to analyze and validate one or more updates applied to the subsequent version of the baseline semantic model.

2. The system of claim 1, wherein at least one of the orchestrator AI agent, the relationship suggestion AI agent, the search suggestion AI agent, the edit suggestion AI agent, or the validation AI agent comprises a LLM agent.

3. The system of claim 1, wherein the relationship suggestion AI agent determines the one or more table relationship suggestions for the select version of the baseline semantic model based on the analyzing of the one or more structured language data query patterns in the set of verified pairs by:
generating a prompt based on the baseline semantic model and the set of verified pairs, the prompt comprising one or more instructions for determining the one or more table relationship suggestions for the select version of the baseline semantic model based on the analyzing of the one or more structured language data query patterns in the set of verified pairs; and
generating, by a select LLM, an output based on the prompt, at least one table relationship suggestion of the one or more table relationship suggestions being determined based on the output.

4. The system of claim 3, wherein the one or more instructions of the prompt comprise at least one of:
a first instruction to identify one or more join paths in at least one structured language data query in the set of verified pairs;
a second instruction to deduplicate the one or more join paths; or a third instruction to generate, as part of the output, one or more table relationship definitions identified based on the deduplicated one or more join paths.

5. The system of claim 1, wherein the search suggestion AI agent determines the one or more searchable dimension suggestions for the given version of the baseline semantic model based on dimension cardinality by:

determining a set of approximate cardinalities for a set of dimensions within the given version of the baseline semantic model;

filtering the set of dimensions based on the set of approximate cardinalities to generate a filtered set of dimensions;

based on one or more pairs of the set of verified pairs, generating a first prompt that comprises one or more instructions to determine, for each individual pair of the one or more pairs, one or more dimensions of the filtered set of dimensions that help answer an individual natural language question of the individual pair;

generating, by a select LLM, a first output based on the first prompt;

generating a second prompt that comprises one or more instructions to aggregate one or more results from the first output and generate a second output that comprises a list of columns; and generating, by the select LLM, the second output based on the second prompt, at least one searchable dimension suggestion of the one or more searchable dimension suggestions being determined based on the list of columns from the second output.

6. The system of claim 1, wherein the edit suggestion AI agent determines one or more edit suggestions for the individual version of the baseline semantic model to improve accuracy of the individual version of the baseline semantic model by:

generating a prompt that comprises one or more instructions to analyze the individual version of the baseline semantic model for one or more discrepancies and determine one or more proposed edits to the individual version of the baseline semantic model based on a resulting analysis; and generating, by a select LLM, an output based on the prompt, at least one edit suggestion of the one or more edit suggestions being determined based on the one or more proposed edits from the output.

7. The system of claim 1, wherein the one or more edit suggestions comprise at least one of:

an addition of a dimension to the individual version of the baseline semantic model;

an addition of a fact to the individual version of the baseline semantic model;

an addition of a metric to the individual version of the baseline semantic model;

an addition of a filter to the individual version of the baseline semantic model;

a name change in the individual version of the baseline semantic model;

a description change in the individual version of the baseline semantic model;

a synonym change in the individual version of the baseline semantic model; or an expression change in the individual version of the baseline semantic model.

8. The system of claim 1, wherein the edit suggestion AI agent determines one or more edit suggestions for the individual version of the baseline semantic model to improve accuracy of the individual version of the baseline semantic model by:

based on one or more existing custom instructions from the individual version of the baseline semantic model, generating a prompt that comprises one or more instructions to update the one or more existing custom instructions; and generating, by a select LLM, an output based on the prompt, the output comprising at least one updated custom instruction, at least one edit suggestion of the one or more edit suggestions comprising updating at least one existing custom instruction in the individual version of the baseline semantic model based on the at least one updated custom instruction.

9. The system of claim 1, wherein the evaluation process performed by the validation AI agent performs comprises:

based on the subsequent version of the baseline semantic model, generating, by an individual LLM, an example structured language data query for a select natural language question from an individual verified pair of the set of verified pairs;

determining whether a set of columns of the example structured language data query are different from a set of columns of a correct structured language data query from the individual verified pair; and in response to determining that the set of columns of the example structured language data query are not different from the set of columns of the correct structured language data query, indicating that the example structured language data query is valid.

10. The system of claim 9, wherein the evaluation process performed by the validation AI agent performs comprises:

in response to determining that the set of columns of the example structured language data query are different from the set of columns of the correct structured language data query:

generating a first query result from the database based on the example structured language data query;

generating a second query result from the database based on a correct structured language data query from the individual verified pair;

using a select LLM to determine whether the first query result and the second query result are equivalent; and in response to determining that the first query result and the second query result are equivalent, indicating that the example structured language data query is valid.

11. The system of claim 1, wherein the validation AI agent tracks an accuracy improvement achieved by an individual AI agent of the plurality of AI agents after the individual AI agent updates a latest version of the baseline semantic model.

12. The system of claim 1, wherein the orchestrator AI agent coordinates the plurality of individual AI agents to update the baseline semantic model with the one or more improvements using an iterative loop, wherein the orchestrator AI agent selects which one or more AI agents of the plurality of AI agents are used to update the baseline semantic model during an individual iteration of the iterative loop, and wherein the orchestrator AI agent selects an order in which the one or more AI agents are used to update the baseline semantic model during the individual iteration of the iterative loop.

13. The system of claim 12, wherein the orchestrator AI agent determines how many iterations of the iterative loop are performed.

14. A method comprising:

accessing, by at least one processor, a baseline semantic model that describes a schema of a database and that enables a large language model (LLM) to generate structured language data queries for the database based on natural language questions;

accessing, by the at least one processor, a data source that comprises a set of verified pairs of natural language questions and structured language data queries; and causing, by the at least one processor, execution of an orchestrator artificial intelligence (AI) agent that coordinates a plurality of individual AI agents to update the baseline semantic model with one or more improvements, the plurality of individual AI agents comprising:

a relationship suggestion AI agent that receives a select version of the baseline semantic model from the orchestrator AI agent, determines one or more table relationship suggestions for the select version of the baseline semantic model based on analyzing one or more structured language data query patterns in the set of verified pairs, and updates the select version of the baseline semantic model based on the one or more table relationship suggestions;

a search suggestion AI agent that receives a given version of the baseline semantic model from the orchestrator AI agent, determines one or more searchable dimension suggestions for the given version of the baseline semantic model based on dimension cardinality, and updates the given version of the baseline semantic model based on the one or more searchable dimension suggestions;

an edit suggestion AI agent that receives an individual version of the baseline semantic model from the orchestrator AI agent, determines one or more edit suggestions for the individual version of the baseline semantic model to improve accuracy of the individual version of the baseline semantic model, and updates the individual version of the baseline semantic model; and a validation AI agent that receives a subsequent version of the baseline semantic model, and performs an evaluation process on the subsequent version of the baseline semantic model to analyze and validate one or more updates applied to the subsequent version of the baseline semantic model.

15. The method of claim 14, wherein at least one of the orchestrator AI agent, the relationship suggestion AI agent, the search suggestion AI agent, the edit suggestion AI agent, or the validation AI agent comprises a LLM agent.

16. The method of claim 14, wherein the relationship suggestion AI agent determines the one or more table relationship suggestions for the select version of the baseline semantic model based on the analyzing of the one or more structured language data query patterns in the set of verified pairs by:

generating a prompt based on the baseline semantic model and the set of verified pairs, the prompt comprising one or more instructions for determining the one or more table relationship suggestions for the select version of the baseline semantic model based on the analyzing of the one or more structured language data query patterns in the set of verified pairs; and generating, by a select LLM, an output based on the prompt, at least one table relationship suggestion of the one or more table relationship suggestions being determined based on the output.

17. The method of claim 14, wherein the search suggestion AI agent determines the one or more searchable dimension suggestions for the given version of the baseline semantic model based on dimension cardinality by:

determining a set of approximate cardinalities for a set of dimensions within the given version of the baseline semantic model;

filtering the set of dimensions based on the set of approximate cardinalities to generate a filtered set of dimensions;

based on one or more pairs of the set of verified pairs, generating a first prompt that comprises one or more instructions to determine, for each individual pair of the one or more pairs, one or more dimensions of the filtered set of dimensions that help answer an individual natural language question of the individual pair;

generating, by a select LLM, a first output based on the first prompt;

generating a second prompt that comprises one or more instructions to aggregate one or more results from the first output generated and generate a second output that comprises a list of columns; and generating, by the select LLM, the second output based on the second prompt, at least one searchable dimension suggestion of the one or more searchable dimension suggestions being determined based on the list of columns from the second output.

18. The method of claim 14, wherein the edit suggestion AI agent determines one or more edit suggestions for the individual version of the baseline semantic model to improve accuracy of the individual version of the baseline semantic model by:

generating a prompt that comprises one or more instructions to analyze the individual version of the baseline semantic model for one or more discrepancies and determine one or more proposed edits to the individual version of the baseline semantic model based on a resulting analysis; and generating, by a select LLM, an output based on the prompt, at least one edit suggestion of the one or more edit suggestions being determined based on the one or more proposed edits from the output.

19. The method of claim 14, wherein the edit suggestion AI agent determines one or more edit suggestions for the individual version of the baseline semantic model to improve accuracy of the individual version of the baseline semantic model by:

based on one or more existing custom instructions from the individual version of the baseline semantic model, generating a prompt that comprises one or more instructions to update the one or more existing custom instructions; and generating, by a select LLM, an output based on the prompt, the output comprising at least one updated custom instruction, at least one edit suggestion of the one or more edit suggestions comprising updating at least one existing custom instruction in the individual version of the baseline semantic model based on the at least one updated custom instruction.

20. A machine-storage medium, the machine-storage medium including instructions that when executed by a machine, cause the machine to perform operations comprising:

accessing a baseline semantic model that describes a schema of a database and that enables a large language model (LLM) to generate structured language data queries for the database based on natural language questions;

accessing a data source that comprises a set of verified pairs of natural language questions and structured language data queries; and causing execution of an orchestrator artificial intelligence (AI) agent that coordinates a plurality of individual AI agents to update the baseline semantic model with one or more improvements, the plurality of individual AI agents comprising:

a relationship suggestion AI agent that receives a select version of the baseline semantic model from the orchestrator AI agent, determines one or more table relationship suggestions for the select version of the baseline semantic model based on analyzing one or more structured language data query patterns in the set of verified pairs, and updates the select version of the baseline semantic model based on the one or more table relationship suggestions;

a search suggestion AI agent that receives a given version of the baseline semantic model from the orchestrator AI agent, determines one or more searchable dimension suggestions for the given version of the baseline semantic model based on dimension cardinality, and updates the given version of the baseline semantic model based on the one or more searchable dimension suggestions;

an edit suggestion AI agent that receives an individual version of the baseline semantic model from the orchestrator AI agent, determines one or more edit suggestions for the individual version of the baseline semantic model to improve accuracy of the individual version of the baseline semantic model, and updates the individual version of the baseline semantic model; and a validation AI agent that receives a subsequent version of the baseline semantic model, and performs an evaluation process on the subsequent version of the baseline semantic model to analyze and validate one or more updates applied to the subsequent version of the baseline semantic model.

* * * * *